United States Patent [19]

Cohen et al.

[11] Patent Number: 4,807,111
[45] Date of Patent: Feb. 21, 1989

[54] DYNAMIC QUEUEING METHOD

[75] Inventors: Edward I. Cohen, Poughkeepsie; Bernard R. Pierce, Hyde Park, both of N.Y.

[73] Assignee: International Business Machines Corporation, Armonk, N.Y.

[21] Appl. No.: 64,911

[22] Filed: Jun. 19, 1987

[51] Int. Cl.$^4$ .............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,924,245 | 12/1975 | Eaton | 364/200 |
| 4,161,778 | 7/1979 | Getson et al. | 364/200 |
| 4,394,729 | 7/1983 | Arnstrong | 364/200 |
| 4,482,956 | 11/1984 | Tallman | 364/200 |
| 4,604,694 | 8/1986 | Hough | 364/200 |

*Primary Examiner*—David Y. Eng
*Attorney, Agent, or Firm*—Bernard M. Goldman

[57] ABSTRACT

This disclosure shortens a dispatching queue by deleting those queue elements having all task blocks in a wait state. The queue has no serializing lock, so that it may be used in parallel by simultaneous requestors in a multiprocessing environment. Whenever any new or deleted element acquires a dispatchable block, a dispatchability indicator is entered for the element; and if the element is off the queue, it is then inserted into the queue in a priority order of elements in the queue. Coordinated communication is provided for all other requestors that may simultaneous access any element (whether on or off the queue) by providing special flag fields for each element that indicate: the changeable/nonchangeable state of the pointer to the next element in the queue, whether the element is on or off the queue, and an identifier of the current requestor accessing the element to possibly insert or delete the element. It is important to understand that although one of these flags is called a "pointer lock", it only controls the "changeability" of the contained pointer to the next queue element, and that this pointer lock does not lock anything (i.e. does not serialize access to anything in the queue); for example, another requestor may read and use any "locked" pointer as long as such other requestor does not change the pointer, since only the current requestor may change a pointer while it is "locked".

36 Claims, 10 Drawing Sheets

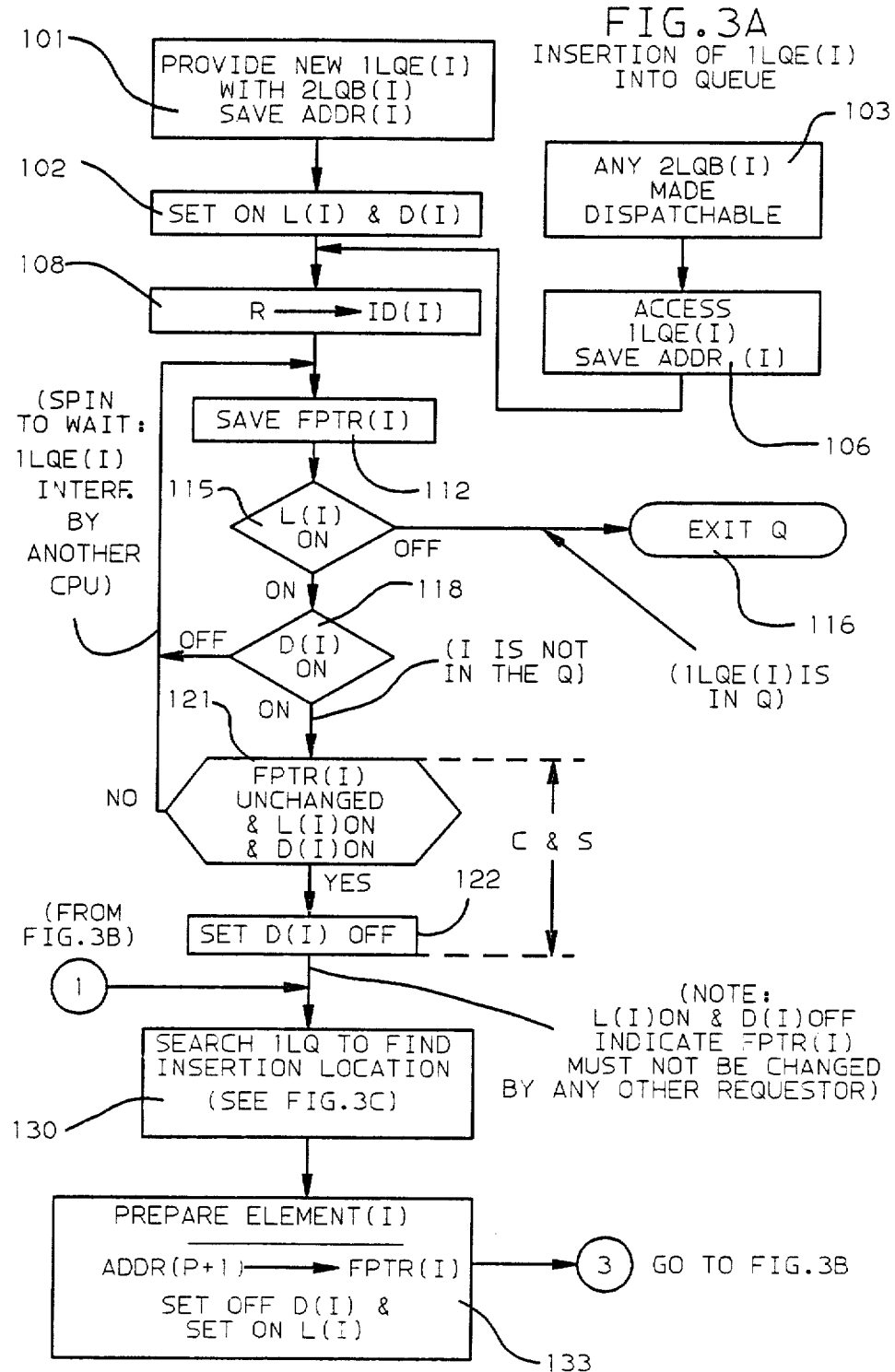

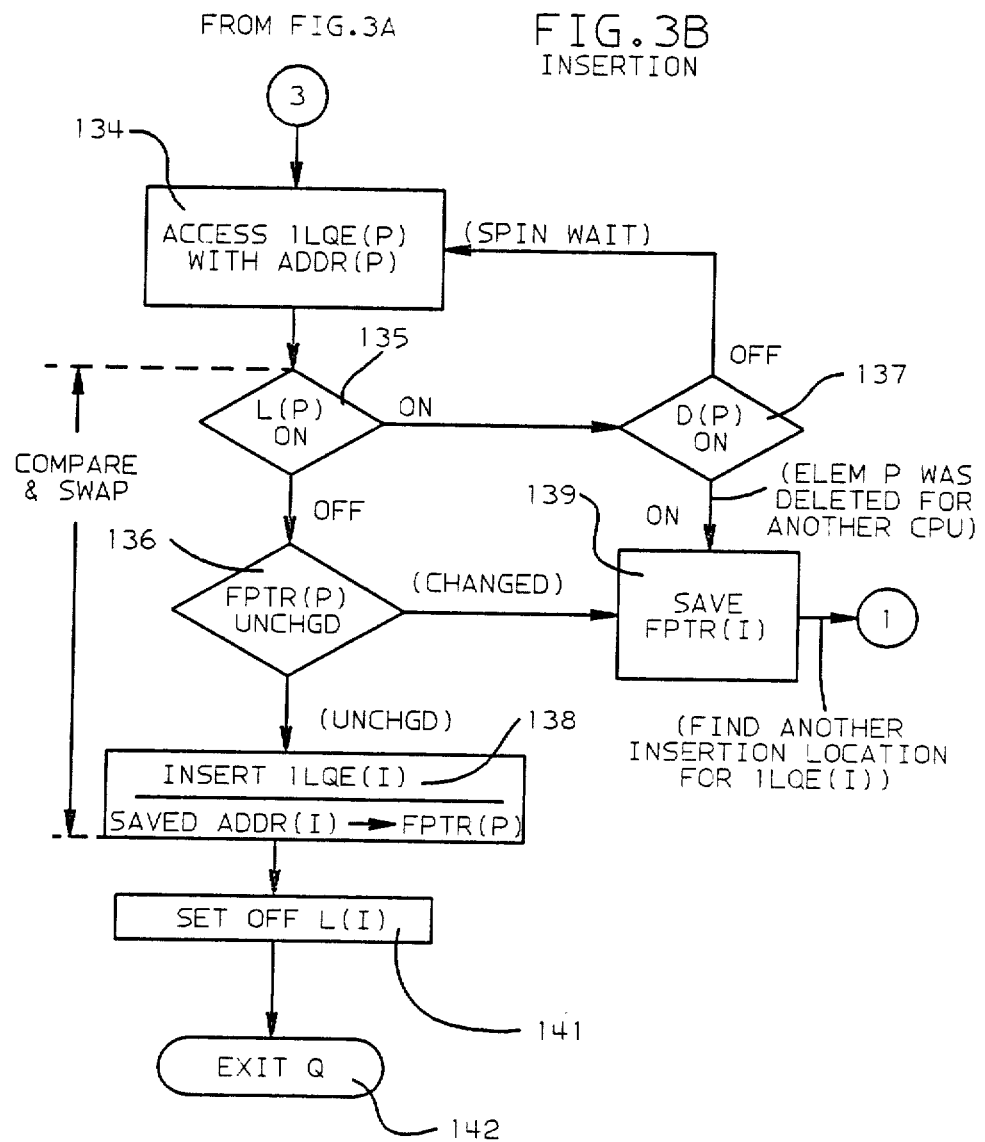

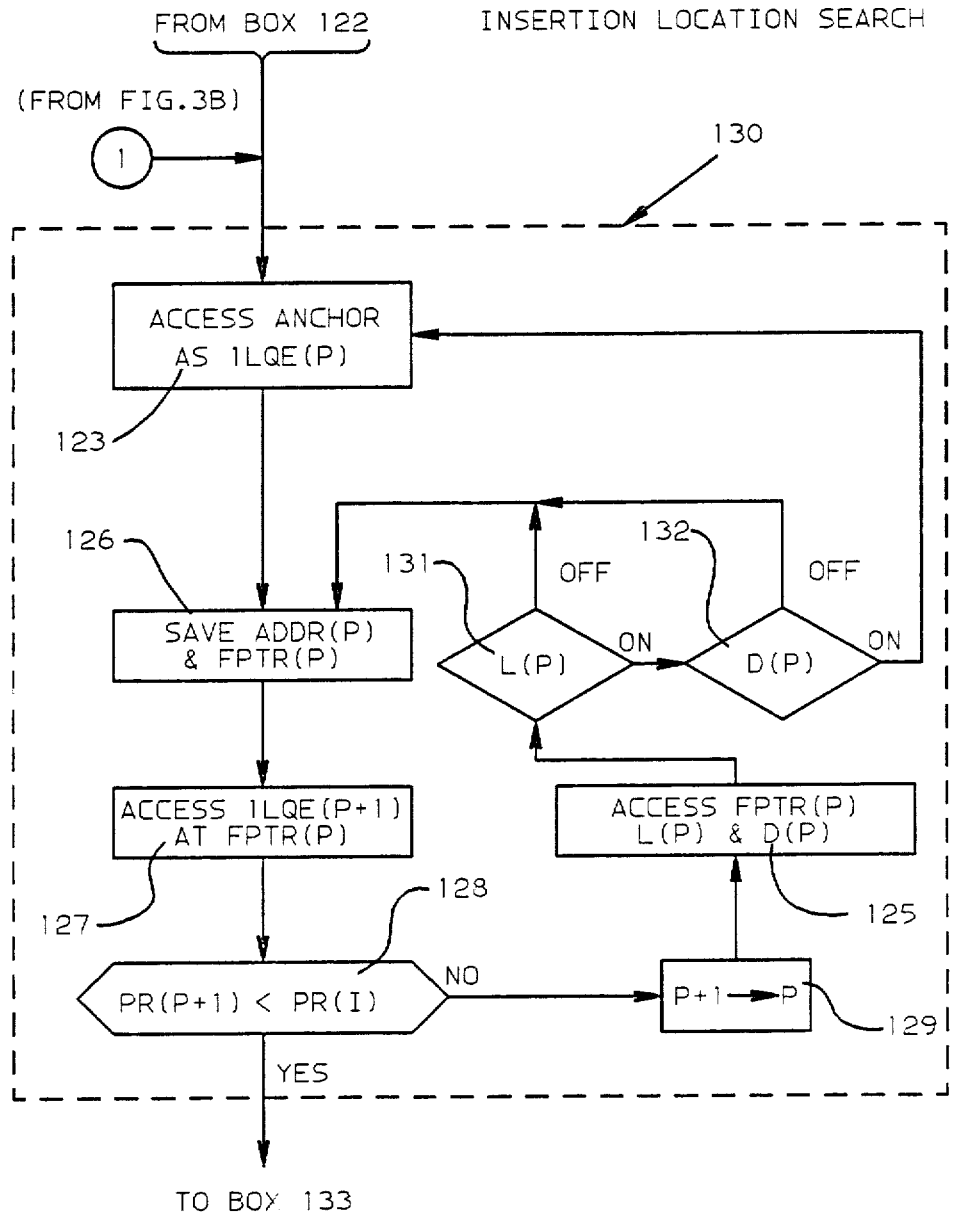
FIG. 3C INSERTION LOCATION SEARCH

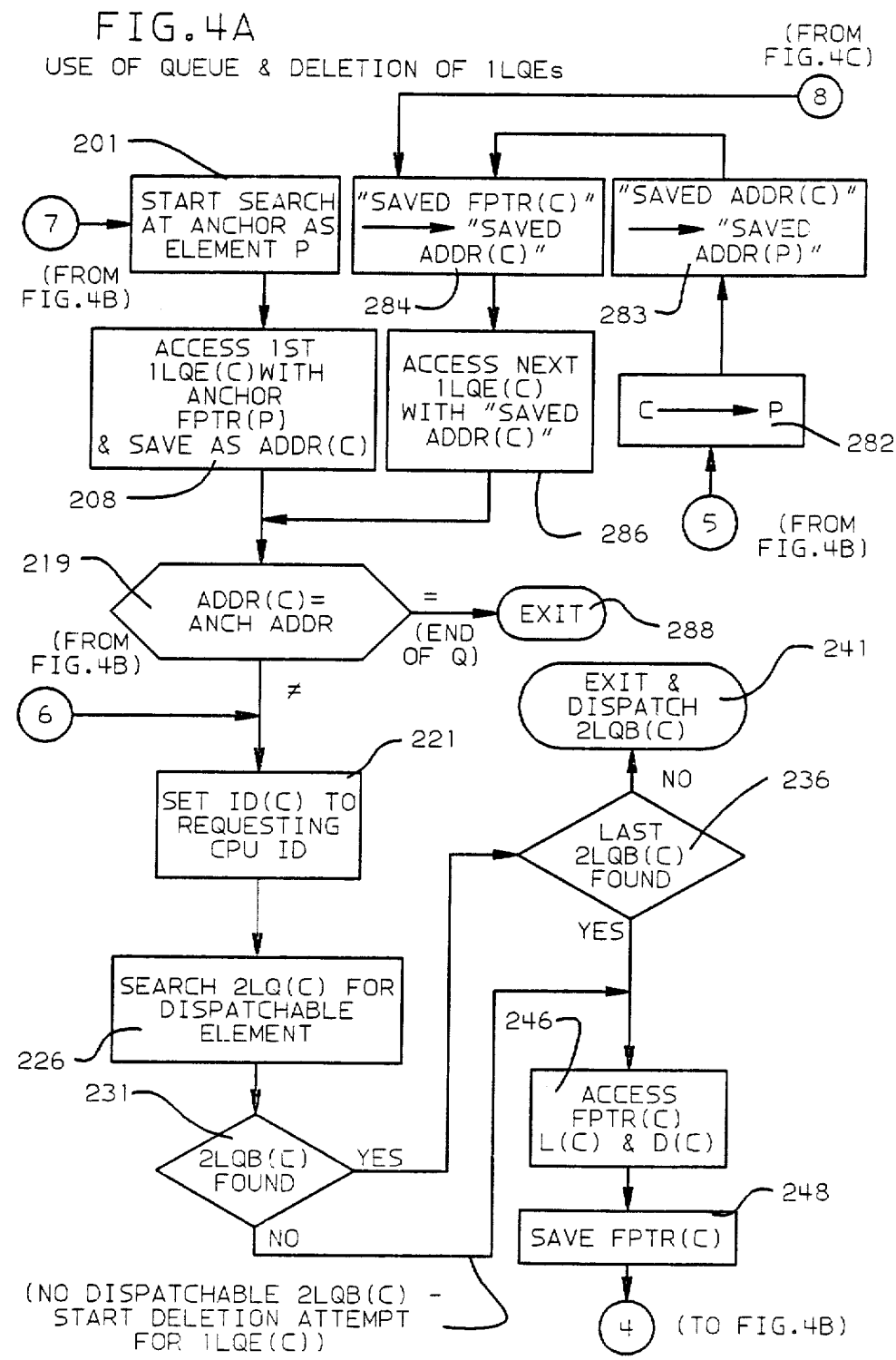

DYNAMIC QUEUEING METHOD

INTRODUCTION

This invention increases the efficiency of processing a queue by deleting from the queue those elements that no longer represent requests for service. Any new or deleted element is inserted into the queue when it receives at least one request for service. The invention performs its element deletion and insertion in a coordinating manner that maintains the integrity of the queue by dealing with contention conditions among the MP processors vying for work, while speeding up the queue management operation. The invention may be used with a dispatching program that supports parallel and asynchronous dispatching on different processors in a multiprocessor (MP) data processing system.

BACKGROUND

System-controlling queues are commonly used in past and current data processing systems. Some queues have been managed by hardware logic circuitry and other queues have been managed by programmed or microprogrammed routines. A large number of queues are commonly used by system control programs to control the reusable hardware and software resources of a data processing system, including queues which are themselves system resources. Dispatching queues have been commonly used in the prior art.

Of foremost importance with any system-controlling queue is that the integrity of the queue must always be maintained. The integrity problem becomes more difficult as the number of central processors increases and the number of users increases in a large system in which the CPUs contend asynchronously for resources in the system.

Each queue is generally comprised of a plurality of entries (often called "elements") in which each element is a unit of the queue. For example, each element of a queue may represent a different waiting request for an I/O device in a system. The queue elements may be dequeued when the requested device is started. At any given time the queue may have anywhere from no elements (indicating no I/O request is waiting for an I/O device) to a large number of elements (indicating a large number of I/O requests are waiting for service).

Another example is a dispatching queue used to receive all user requests for the execution of a user program. Elements on the queue are associated with the different user program task requests and indicate which user task requests are ready to be executed by a CPU so they can be dispatched.

Queues may be classified into several general types according to the relative locations of the elements in the queue; and they are: (1) contiguous queues with elements physically located next to each other, (2) linear chained queues with elements physically dispersed anywhere in main or virtual storage (MS or VS), and (3) hierarchical chained queues that speed up queue operation by using hierarchical searching.

All queues have an anchor (header) at a predetermined location in storage for providing an entry point into the queue. The anchor contains an address (called an anchor pointer) which addresses one end of a chain of variable elements comprising the queue. Each element may contain a pointer to a next element in the queue and be a single threaded queue, or each element may contain backward and forward pointers and be a double threaded queue. The last element in the queue chain has an indicator code (often all zeroes) in its pointer location to identify it as the last element. If there is no variable element currently in the queue (i.e. the queue is empty), the anchor pointer contains an empty code (e.g. all zeroes).

Elements may be inserted (added) into, or deleted from, a chained single-threaded queue. The easiest and fastest insertion and deletion is of the anchor pointed element, which is done by changing the anchor pointer itself. Insertion of a new element between two existing elements in the queue involves moving the pointer field in the prior element into the pointer field in a new element, and putting the address of the new element into the pointer field of the prior element in the queue. Deletion of an element from the queue involves moving the pointer field in the deleted element into the pointer field in its prior element.

A chained queue may be a last-in/first-out (LIFO) queue, a first-in/first-out (FIFO) queue, an ordered queue, or some other type of non-LIFO organization. The subject invention is primarily directed to the environment of chained hierarchical queue operations requiring the ordering of elements in accordance with values in their priority fields.

The simplest queues use LIFO operations which always insert and delete each new element next to the anchor in a queue. Thus, the anchor pointed element is always the newest and last element in a pure LIFO queue. However, many data processing activities cannot use LIFO queue operation and require FIFO, ordered, or some other type of dequeueing selection.

Multiprocessing (MP) systems have two or more processors, e.g. CPUs that can simultaneously and asynchronously be executing separate instruction streams in relation to a shared main storage (MS). MP has been recognized in the prior art to present special queue problems. For example, it has been recognized that it is undesirable for any processor to take action based on an incompleted change in the queue by another processor. This would adversely affect the integrity of the queue and of information obtained therefrom. For example, this could happen if a second processor attempts to change an element in a queue while a first processor is changing the same element in the queue. System deadlock and failure can result.

The prevention of asynchronous changes in queue elements has been supported by the atomic operation of the S/370 Test and Set (TS) or Compare and Swap (CS or CDS) instruction operation on a queue lock field to prevent MP conflict in changing the queue. The atomic instruction operation assures that only one program at a time will change the content of a selected part of a queue.

Maintaining queue integrity has required the use of coordinating conventions among all programs using a queue by requiring all programs to voluntarily check the state of certain fields by using the atomic instructions to make changes to the queue, such as to a lock field, and honor its state before attempting to change the queue.

MP queue conflict has been generally solved in different ways in the prior art. One prior solution associates a lock field with the anchor of the queue to enable serialization of all accesses to the queue which may change the queue, so that only one program will access the queue to change it at any given time. Other programs seeing the lock is set on will avoid trying to change the queue. When any queue accessing program is done changing the queue, it changes the lock field to indicate an unlocked state, so that it will appear in unlocked state to the next program desiring to use the queue. With this prior technique, only a single queue-accessing program can change the queue at a time, and simultaneous change operations on the queue are not done.

The prior pure LIFO (last-in/first-out) queueing method does not require any lock associated with the queue anchor when it uses the atomic operation to insert or delete the anchor pointed element. The LIFO queue enables hardware serialization of parallel requests from different programs on plural CPUs to enqueue and dequeue the current anchor pointed element on the single queue, while maintaining the integrity of the queue which is of foremost importance. This solution uses the IBM System/370 CS or CDS instruction directly on the queue anchor pointer to accomplish the element insertion or deletion of the anchor pointed element. Background on this type of use of the Compare and Swap instruction on a queue element is found in the IBM System/370 Principles of Operation (GA22-7000-8) pages 7-12 to 7-14 and its Appendix A pages A40 to A46, in particular the section entitled "Free-Pool Manipulation". The Compare and Swap instruction is provided in two forms for handling either a single word field (CS instruction) or a double word field (CDS instruction); and the size of queue anchor field (i.e. one word or two words) determines the use of CS or CDS for a single element LIFO insertion or deletion operation on a queue. During the CS or CDS instruction execution, no processor in a MP can interfere with an enqueueing or dequeueing operation being done by another processor, provided the field being handled has the one or two word size limitation of the respective instruction, and provided that the instruction is used properly.

All System/370 queue management programs have available the address of the queue anchor pointer as a displacement D2 from the current content of a specified base general register B2. Each queue management routine must then set up the operands for the CS or CDS instruction, which include loading any available general register R1 with the contents of the storage location identified by the effective address of D2(B2), which may be the current anchor pointer content that addresses the first queue element. To insert a LIFO element, the queue management program must initially set up the new element which later is to be inserted in the queue, store the anchor pointer in the element as the element's pointer, and store the address to the element into a general register R3. To delete an element, the queue management program must initially store into a general register R3 the content of the pointer within the anchor pointed element to be deleted from the queue. Then the Compare and Swap instruction CS is executed in an attempt to effect the requested insertion or deletion. When executed, the CS instruction tests R1 to determine if the content of the anchor pointer has changed; and if not changed, the address in R3 is atomically stored into the anchor pointer to cause the insertion or deletion of the anchor pointer element to take place in the queue. If CS or CDS execution finds the anchor pointer has changed since R1 was set up, the insertion or deletion attempt fails, but R1 is reloaded with the current anchor pointer for a next try. A condition code (CC) for the CS instruction indicates if its execution has succeeded or failed.

Nevertheless, experience has taught that some risk still exists for destroying the queue during enqueueing and dequeueing operations when only the anchor pointer is swapped by a CS instruction for an insertion or deletion element in LIFO operations.

The integrity risk is that: (1) while a first program is attempting to dequeue a single element then on the queue after finding the pointer is zero in the anchor pointed element, (2) a second program dequeues that element, inserts a new element, and then reinserts the element it had previously dequeued as a new anchor pointed element, and (3) all before the first program executes its CS instruction. In this case, the first program then executes its CS instruction successfully, because it will compare equal with the reinserted anchor pointer. Unfortunately in this case, the CS instruction of the first program will insert an all zero field in the anchor pointer to indicate an empty queue, because the first program is unaware that another element had been put into the queue in the interim period. That zero anchor pointer destroys the queue because it breaks the pointer chain and thereby ignores the existence of an element on the queue, which is then not empty.

A high risk queue is a useless queue in a high speed data processing system, because queue failure will most likely cause the data processing operation to stop or to produce erroneous results. The detection of this type of software failure may be difficult to find and correct, resulting in expensive down time for the system.

This significant risk to queue integrity has been found in the prior art to be relieved by the addition of a counter field located contiguously with the anchor pointer, in which each is a one word field and they are swapped as a unit by a CDS instruction.

The CS or CDS instruction is followed by a conditional branch instruction which tests the condition code of the executed CS or CDS instruction to determine if the requested element insertion or deletion was successful. If unsuccessful, the routine loops back to again revalidate the R3 content and then re-execute the CS or CDS instruction, and if necessary repeat the looping back until the CS or CDS execution is successful.

The following prior art System/370 assembler language coding taken from the IBM System/370 Principles of Operation provides examples of insertion and deletion queue management routines which include a count value with the anchor pointer, wherein the use of the count value is essential to the integrity of the queue. The CDS instruction allows a word size anchor pointer and a contiguous word size count value to be stored into the queue anchor block as a unit on a successful execution of the CDS instruction.

Element Insertion Routine - Initial Conditions:
GR0 will be loaded with the anchor pointer.
GR1 will be loaded with the counter value.
GR2 contains the address of the element to be added.
GR3 will contain the decremented counter value.
GR4 contains the address of the anchor pointer.

| | | | |
|---|---|---|---|
| ADDQ | LM | 0,1,0(4) | GR0,GR1 = contents of the anchor pointer and counter. |
| TRYAGN | ST | 0,0,(2) | Point the new element to the current top element in the list. |
| | LR | 3,1 | Move the counter to GR3. |
| BCTR | 3,0 | | Decrement the counter. |
| | CDS | 0,2,0(4) | Update the anchor pointer and |

-continued

```
                              counter.
         BNE  TRYAGN
Element Deletion Routine - Initial Conditions:
GR4 contains the address of the anchor pointer.
GR0 will contain the address of the anchor pointed
element to be deleted.
GR1 will contain the unchanged counter value.
GR2 will be loaded with the anchor pointer.
GR3 will be loaded with the changed counter value.
DELETQ   LM   2,3,0,(4)   GR2,GR3 = contents of the
                          anchor pointer and counter.
TRYAGN   LTR  2,2         Is the list empty?
         BZ   EMPTY       Yes, get help.
         L    0,0(2)      No, GR0 = the pointer from the
                          last entered element (N).
         LR   1,3         Move the counter to GR1.
         CDS  2,0,0(4)    Update the anchor pointer and
                          counter.
         BNE  TRYAGN
USE      (Any Instruction) The address of the removed
                          element is in GR2 = R1.
```

A CPU is considered to be in the process of inserting or deleting an element on a queue from the time it begins executing an element insertion or deletion routine until an execution of the routine finds the condition code of its CS or CDS instruction to be zero, indicating its insertion or deletion was successful. Thus, several programs on different CPUs in a MP can be simultaneously executing insertion or deletion programs on the same LIFO queue with looping (called "spinning") by some of the routine until the contention ends for each routine when its CS or CDS instruction is executed successfully.

An example of interference can be visualized by having two CPUs concurrently executing queue management routines on the same LIFO queue. Either CPU may be attempting insertion or deletion on the LIFO queue asynchronously in that neither CPU knows that the other is attempting to access the LIFO queue, i.e. there is no synchronizing communication signalling between them. Suppose the first CPU routine has begun execution by setting up its operands, but has not yet executed its CDS instruction when the second CPU routine has successfully executed its CDS instruction to obtain a successful insertion or deletion of the current anchor pointed element, which changes the content of the anchor pointer at storage location D2(B2). Then, when the first CPU routine executes its CDS instruction, it will be unsuccessful because the actual anchor pointer at D2(B2) or the counter, will compare unequal with the previously loaded anchor pointer in R1 or the counter in R1+1. However, the unsuccessful CDS execution will reload R1 with the new actual pointer value in preparation for the next CDS execution attempt by the first CPU. If the actual pointer value and counter at D2(B2) has not changed from the R1 and R1+1 content at the time of the next CDS execution, it will then be successful.

Accordingly, the CDS instruction operation prevents an improper queue change by requiring the existence of all essential conditions in order to maintain the integrity of the queue under interference situations. Prior art queue management programs have been doing these insertion and deletion routines for many years for LIFO queue operation without any lock on the queue, because this type of programming has permitted parallel LIFO insertion and deletion operations by plural programs and CPUs. Unfortunately, this type of unlocked queue operation cannot be used for non-LIFO queue operation, such as FIFO (first-in, first-out) operations.

In the prior art, certain FIFO results have been obtained by using an input queue and an output queue, which duplicate the same elements. The input queue is LIFO for inserting received elements, and the output queue is generated from the input queue, wherein the elements are occasionally rechained in a sorted sequence by values in their priority fields to provide an ordered output queue. This technique has been used in the IEAVEDS0 and IEAVESC1 modules in a prior IBM MVS program. Elements can be inserted efficiently on the input queue by plural CPUs without queue integrity loss without locking the input queue by using the above described compare and swap techniques for inserting each new element as a new anchor pointed element in the input queue, as explained above for LIFO element insertion. The output queue is generated when certain conditions occur (e.g. maximum input queue size is reached or the output queue is empty), and both queues are locked (which prevents further use of both queues) while all elements of the input queue are put into an ordered sequence from the output queue anchor to generate the output queue, leaving the input queue empty and ready to receive new elements. The output queue always operates with a lock to prevent insertion, but allows ordered dequeueing (deletion) without using a dequeueing lock by dequeueing from the anchor pointed element. The prevention of use of both of these queues during their occasional reorganization is a system liability because it may cause temporary suspension of some system operations during queue reorganization.

Another prior queue control method is described and claimed in U.S. Pat. No. 4,482,956 to P. H. Tallman, and assigned to the same assignee as the present invention. It enables parallel operations in a single chained queue by element insertion routines that are simultaneously executing on plural processors while an element deletion routine on any processor may be simultaneously removing any element on the queue. That is, in a single chained queue in storage, one processor in an MP may execute a programmed routine for finding and deleting any element in combination with any number of other processors simultaneously executing programmed routines for inserting anchor pointed elements. An anchor associated dequeueing lock is set on for serializing the deletion processing to one element at a time but does not affect simultaneous parallel processing of one or more routines for enqueueing anchor pointed elements.

Also, in U.S. Pat. No. 4,482,956 the non-LIFO locked dequeueing processing of a non-anchor pointed element involved searching the queue (beginning with the anchor pointer) for the requested element and outputting the pointer to it in its prior element in the queue sequence as the address of the dequeued element. Then it is dequeued by moving into the prior element the pointer within the dequeued element. This deletes the dequeued element from the queue by changing its prior element pointer to address the queue element that followed the dequeued element in the queue sequence. The locked dequeueing of an anchor pointed element involves changing the anchor pointer to address the queue element that followed the anchor pointed element being dequeued in the queue sequence, and outputting the address of the anchor pointed element being dequeued.

An important special case of non-LIFO processing is FIFO (first-in/first-out) processing which finds the last element in the queue as the required element. The last element is conventionally identified by an end-of-queue code in its pointer field, which is looked for and dequeued during a FIFO operation. U.S. Pat. No. 4,482,956 provides efficient processing in a non-pure LIFO queue, which is non-pure because the queue can, at the user's option, be used for either LIFO or non-LIFO dequeueing. It does not use any lock on the queue when inserting anchor pointed elements on the queue, for which queue integrity is maintained by using the System/370 compare and swap instruction in a manner similar to the way this instruction has been used in the prior art for inserting and deleting anchor-pointed elements in prior pure LIFO queues.

A prior shared/exclusive locking method for MP of a different type than the subject invention is disclosed in an article entitled "Shared Locking Without A Lock" by M. Taradalsky on page 1545 of Vol. 18, No. 5, October 1975 of the IBM Technical Disclosure Bulletin. This queue also serializes all requests for changing the queue, so that only one can change it at a time, although multiple parallel read requests can be handled.

Still another prior queue control method is described and claimed in U.S. Pat. No. 4,604,694 to R. E. Hough and assigned to the same assignee as the present invention. It provides a unique shared/exclusive queue for resource control in a MP system. It also uses an anchor associated lockword in its method for controlling both shared and exclusive access for a resource in a MP system, wherein a FIFO queue is formed for tasks suspended while awaiting access to the resource. The lockword is established having two parts, a lock flag indicating the status of the resource, whether available, under shared ownership or under exclusive ownership, and a lock (i.e. anchor pointer) pointing to the most recently enqueued task. In requesting or releasing access, an initial guess is made as to the value of the lockword and a projected lockword is calculated based on the guess. Then an atomic reference is made to the lockword during which no other processor has access to the lockword. During the atomic reference, the lockword is compared to the guess of the lockword and if the guess is correct, the lockword is replaced by the projected lockword which rearranges the queue for the requesting or releasing task. If the guess was incorrect, the value of the lockword is used to calculate another projected lockword. If another task can affect the next tasks to gain access, the process with the atomic reference is repeated until no intervening changes occur between atomic references.

The prior filed U.S. patent application entitled "Extended Atomic Operations" by R. Obermarck et al Ser. No. 787,221, 10/15/85, and assigned to the same assignee as the present invention, discloses a queue which allows a plurality of requestors to add to the one end of a queue and to output from the other end of the queue which maintains the received order. Atomic operations are used for enqueueing and dequeueing only one element at a time. A counter protocol is disclosed for managing the queue, and a search of the queue is used for finding the oldest element to dequeue. The counter protocol uses a request counter associated with the queue header for adding elements to the queue, and a credit counter used for serializing the dequeueing of elements one at a time. Unlike the subject application, the Obermarck et al. application does not allow for inserting an element anywhere in the queue, for deleting an element anywhere in the queue, or for plural concurrent queue element deletions.

Prior IBM MVS programs have used a dispatching queue which is a chained hierarchical queue with a second level queue access lock field in each of first-level elements of the queue to control the serialization of accesses to each element's associated second level queues. The first-level elements are address space control blocks (ASBBs) which contain both forward pointers and backward pointers in relation to the queue's anchor element. The two second level queues are a system request block (SRB queue and a task control block (TCB) queue associated with each ASCB: and their order of search is to first search the SRB queue and then the TCB queue for a dispatchable block. The task control block (TCB) is an ordered queue. The queue is a LIFO queue comprised of system request blocks (SRBs). The second level blocks are in active or wait states to control CPU dispatching in an MP system.

In the prior MVS dispatching queue, the first-level elements are left permanently on the queue as long as they are in main memory. They are only deleted from queue when they are swapped out of main memory to auxiliary storage. They are reinstated into the queue when they are swapped back into main memory. Whether or not an element has all of its blocks non-dispatchable (in wait state) has no effect on whether or not the element is deleted from or inserted in the queue. The first-level elements remain in the queue regardless of whether any associated second level block is dispatchable, even when all associated second level blocks are inactive in I/O wait state.

The prior hierarchical queue has a queue anchor through which the queue is accessed by a dispatching program on any CPU in the system. A pointer in the anchor locates the first of the first-level elements of the queue (which is associated with the highest-priority second level blocks) and is chained in a priority sequence to the other first level elements. (See prior cited IBM Technical Disclosure Bulletin article by M. Taradalsky.

Different processes (and processors) may be simultaneously searching through the first level elements in the queue including simultaneously accessing the same first level element.

As systems have gotten larger and more powerful (executing 10's of millions of instructions per second with multiple CPU's in a system), the dispatching queue has grown to large size, sometimes having hundreds of first level elements. This results in long serecjtimes in the queue for finding the next task to dispatch on each of the various one or more CPU's in the system, since the search may need to examine a great number of higher level first level elements before it can find the first dispatchable block at some lower priority level. The second-level blocks may or may not be chained priority sequence in their sets. This increase in queue length has substantially increased the dispatching overheard in large systems.

SUMMARY OF THE INVENTION

The invention applies to management of a resource allocation queue in a manner that can significantly decrease the amount of processor time needed for performing the queue resource allocation operation to increase the efficiency of the system.

The invention deletes from the queue any queue element that no longer represents an unsatisfied for a resource managed by the queue. Under special circumstances, an element may be permitted to remain on the queue when it has no unsatisfied request, such as while that element or its associated blocks are being reorganized by another requestor. The invention inserts any deleted element back into the queue at its correct position relative to other elements in the queue, whenever the element again represents an unsatisfied request for a resource managed by the queue. Thus, the queue only contains active requesting elements, and inactive elements not having an unsatisfied request are not in the queue during the period that they are inactive. The invention increases system efficiency when the queue overhead of managing the insertion and deletion of elements is less than the queue overhead of accessing inactive elements on the queue.

The processes of deletion from the queue, and insertion into the queue, should not be interrupted, and therefore I/O interrupts and other interrupts should be disabled, whenever possible during queue operation.

This invention may be applied to a queue which contains only first elements. The invention deletes an element from such queue when a request (represented in the element) is satisfied, and inserts an element into the queue whenever the element becomes an active requestor of the resource managed by the queue.

The invention applies also to hierarachical queues in which each element in the queue may be associated with a plurality of blocks. In a hierarchical queue, an element is active in the queue when any block associated with the element has an active request for the queue-controlled resource. A hierarchical queue also may become unduly long and burdensome when it contains a significant number of inactive elements that must be accessed during queue operation to take up valuable system time for finding they are not actively requesting any resource at that time. A hierarchical queue, by itself without this invention, can greatly shorten the first level path from the queue anchor to speed up queue operation. With this invention, a hierarchical queue may be made more efficient in its use of system time.

An important example of the use of the invention is by a hierarchical queue that manages plural CPU resources in a data processing system. In such case, the queue manages the CPU resources by controlling which requestor gets the next use of an available CPU resource. CPU allocation management is commonly referred to as controlling the "dispatching" of programs on the CPU(s) in a system. The resource (an available CPU, of one or more CPUs in the system) is allocated to a program requested by a block associated with the currently requesting element having the highest priority in the dispatching queue. Dispatching queues have been made hierarchical to increase their system efficiency, and this invention has been found to significantly increase their efficiency in large systems having several CPUs allocated by the queue.

The invention thus may be applied to a hierarchical type of queue in which any first level element may be deleted from the queue after all of its second level blocks have an inactive request state.

The queue anchor does not have a lock associated with the entire queue. The first level elements in the queue hierarchy are required to have forward pointers chaining from the anchor. The last element in the queue may have a forward pointer circularly addressing the anchor.

The queue structure of this invention enables faster searching of the queue (without any increase in CPU speed) by decreasing the number of first level queue elements which must be searched. This speedup is obtained by deleting from the queue each first-level element having all of its second level blocks in undispatchable state, such as occurs when they represent tasks waiting for the completion of an I/O operation before they can continue their execution.

The invention inserts a deleted first level element back on the queue whenever any of its associated second level blocks becomes dispatchable, such as after a task gets an I/O interrupt signal that its requested I/O operation has completed.

Each first-level element contains at least a priority field, a delete field, a pointer lock field, a first level pointer field for addressing any next first-level element. For a hierarchical queue, second level pointer fields are used for addressing associated second-level queue(s) of blocks. An ID field in any first level element receives either: (1) the identifier (ID) of a CPU which is currently requesting the system dispatcher program for work for deletion, or (2) an indicator that an associated second level block has been made dispatchable for insertion.

There will usually be other fields in the first level element which are not pertinent to this invention and therefore they will not be described. For example, each first-level element may be an address space control block (ASCB) in the IBM/MVS operating system environment. Each ASCB has a large number of fields, including a second level queue lock field for serializing write accesses to the second level task control block (TCB) queue associated with each first level element. Such second level queue lock field is in the prior art, and is distinct from, and is not related to the pointer lock field in the subject invention. It is important to understand these very different types of locking distinctions, so as not to get bogged down in the confusing prior art of programming locks which are not pertinent to this invention.

When the invention is added to a system using the MVS ASCB type of dispatching queue, the invention may be implemented by providing its required fields as added fields in each ASCB.

The invention eliminates the need for fields in the ASCB previously used for the dispatching queue and not used by the subject invention.

However the invention need not use ASCBs and may be constructed of unique first level elements and may or may not use associated second level queues.

The system dispatcher program is a reentrant readonly program which may operate on any CPU in the system to control the dispatching of programs on the CPUs in the system. Whenever a CPU temporarily stops its execution of a current system task or user task (such as when an I/O request is started for the task), the dispatcher makes a dispatching request on behalf of the CPU requesting work by going to the dispatching queue to find a dispatchable system task or user task to run on the CPU (while the stopped task waits for completion of its I/O request). To get CPU work, the dispatcher accesses the queue anchor to start a search of the dispatcher queue. With this invention, only the first level elements having dispatchable blocks are maintained on the queue, and a search for dispatchable work is usually satisfied at the first of the first level elements, which is usually the highest priority active element currently in system. Only in rare instances will interference conditions prevent the current requestor from accessing the highest priority first level element.

As soon as all dispatchable elements of highest priority have been dispatched, the invention will delete the element from the queue, so that the next lower priority first level element with dispatchable blocks becomes the first element in the queue, which is addressed by the queue anchor.

With prior dispatching queues, which are comprised of all first level elements currently in main storage, the dispatcher may be required to search through dozens of elements having no dispatchable block before finding an element with a dispatchable block.

The invention may reduce the number of elements from, for example 100 in a conventional dispatching queue to only the three or four elements in the queue currently having any dispatchable blocks. The order of queue reduction due to this invention can therefore be very significant in providing a large increase in dispatching performance for systems normally having long queues of elements.

A dispatchable operation begins when a task executing on any CPU in a MP completes or goes into wait state due to it making an I/O request and needing to wait for the I/O operation to complete. In the latter case, the wait flag is set on in the TCB of that task, and the dispatching program is called to execute on that CPU to find another task for it to execute. Then the dispatcher's execution accesses the queue and or to begin a dispatching request for that CPU, and it accesses the queue anchor to find the element which is currently the highest-priority first-level element likely to have a dispatchable associated second level block, which is taken and dispatched on the requesting CPU. This element will be deleted from the queue by this invention only if the dispatching request has taken its last ready associated second level block. If one or more dispatchable blocks remain, the first level element's delete field and forward pointer lock field both remains off, and other requesting CPUs can simultaneously be accessing the same element and taking other associated second level blocks which remained available for being dispatched by requests for the CPUs.

When the last associated dispatchable second level block is taken for a dispatching request, the dispatcher deletes that first level element with its associated second level queues of non-dispatchable elements from the queue, and then the next first level element in the queue becomes its highest priority active element which is accessed by CPU dispatching requests. As a result, most requests are satisfied by searching only one queue element, eliminating the prior need to search through a large number of first level elements not having any dispatchable blocks.

The invention includes MP conflict controls that enable the parallel queue accessing operations for multiple requesting CPUs. These controls include processes provided by this invention for using conflict communicating fields also provided by this invention in each first level element useable by the queue. For example, when the dispatcher accesses a first level element, it writes into that element's ID the ID of the CPU causing the current dispatching request. Thereafter if the dispatcher finds no remaining dispatchable second level blocks (after taking one), it sets on the first level pointer lock field to communicate the deletion determination of that first level element from the queue. But before that first level element's deletion determination causes its removal, the dispatcher tests the ID field to see if new dispatchability was provided on that first level element by the dispatcher concurrently activating another second level in an associated second level queue. A change in the ID field indicates to the current requestor that it should not be deleted from the queue, and the pointer lock is set off.

Also, the ID field test may show that another requestor is simultaneously accessing the same first level element, in which case the current requestor will not delete the element. The other requestor may delete the element.

If the ID field test found the requesting CPU ID had not been changed and the last associated block was removed, the deletion is made final by setting on the delete field after successfully moving the pointer in the deleted first level element into the pointer of its immediately preceding first level element (which may be the anchor).

Several critical possibilities are handled which may occur while deletion conditions are detected by a current CPU request (e.g. no dispatchable associated block). One possibility is that a concurrent CPU request could have just deleted that first level element. This possibility is detected by examining the states of both the pointer lock field and the delete field before trying to set them on and makes the deletion. If both fields are found to be on, the element has been deleted, and then one of two courses of action is taken, which depends on whether the current CPU request found a dispatchable block. If a block was found, it is dispatched to satisfy the request. But if no block was found, the request starts its search over again by going back to the anchor.

Another critical possibility is that the prior element (in the queue during the current search) has been deleted, even though the current request processing finds both the pointer lock and deletion fields are off in the currently searched element, its ID field has not changed, and there is no remaining dispatchable block associated with the current element. The current deletion process checks the state of the prior element's first-level pointer and its pointer lock fields to indicate that they have not been changed in this prior element so that the prior element's pointer is valid for receiving the first level pointer field of the current element to delete the current element. If the prior element's first level pointer was changed, the current element cannot be deleted, and the forward pointer lock field is set off (leaving the element n the queue).

The invention also handles elements not on the queue, which include the deleted elements and new elements being put into the system, such as by users entering the system.

In an operating system such as the IBM MVS or MVS/XA program, a new first level element (ASCB) is generated whenever a user identifies himself to the system, such as by logging onto the system. A new element is generated by MVS as an address space control block (ASCB), and the invention inserts it into the queue when it has a dispatchable second level block such as a TCB or SRB.

An existing element previously deleted from the queue may at any time have any associated block become dispatchable. Upon such occurrence the invention will insert the deleted element back into the queue.

The insertion location in the queue for a new or previously deleted element may be, for example, at a queue location determined by the element's dispatching priority indicated in a priority field in each element.

Conflict control processing by the invention maintains the queue integrity during the element insertion case as well as during the deletion case in the parallel and asynchronous environment of a large MP system. For example, plural CPU requestors may simultaneously be accessing the same deleted element in order to insert it into the queue. This may happen when the operating system is operating simultaneously on multiple CPUs to make different blocks dispatchable on the same element. In this case, the dispatcher will recognize the simultaneous requests and allow only one requestor to continue the insertion attempt for the element.

To insert the element into the queue, the queue is searched starting with the anchor until the insertion point is found, for example, based on the deleted element's dispatching priority. After finding an insertion location in the queue during an element insertion attempt, the element in the queue prior to the insertion location has a first level pointer needed for the insertion of the current element. It is possible that another CPU requestors may be interfering with that prior element by trying simultaneously to delete the prior element or by trying to insert a different element at the insertion point. The invention then will detect the interference and will begin again the search for the insertion point, beginning at the queue anchor.

BRIEF DESCRIPTION OF THE DRAWINGS

FIGS. 3A, 3B and 3C represent a flow diagram of a process for inserting a new or previously deleted first level element and its associated second level blocks back onto the queue.

FIGS. 4A, 4B and 4C represent a flow diagram of a process for deleting a first level element and its associated second level blocks from the queue if appropriate conditions exist, while the queue is being used to find second level blocks which are in a dispatchable state.

A BACKGROUND EXAMPLE

Figure 1:
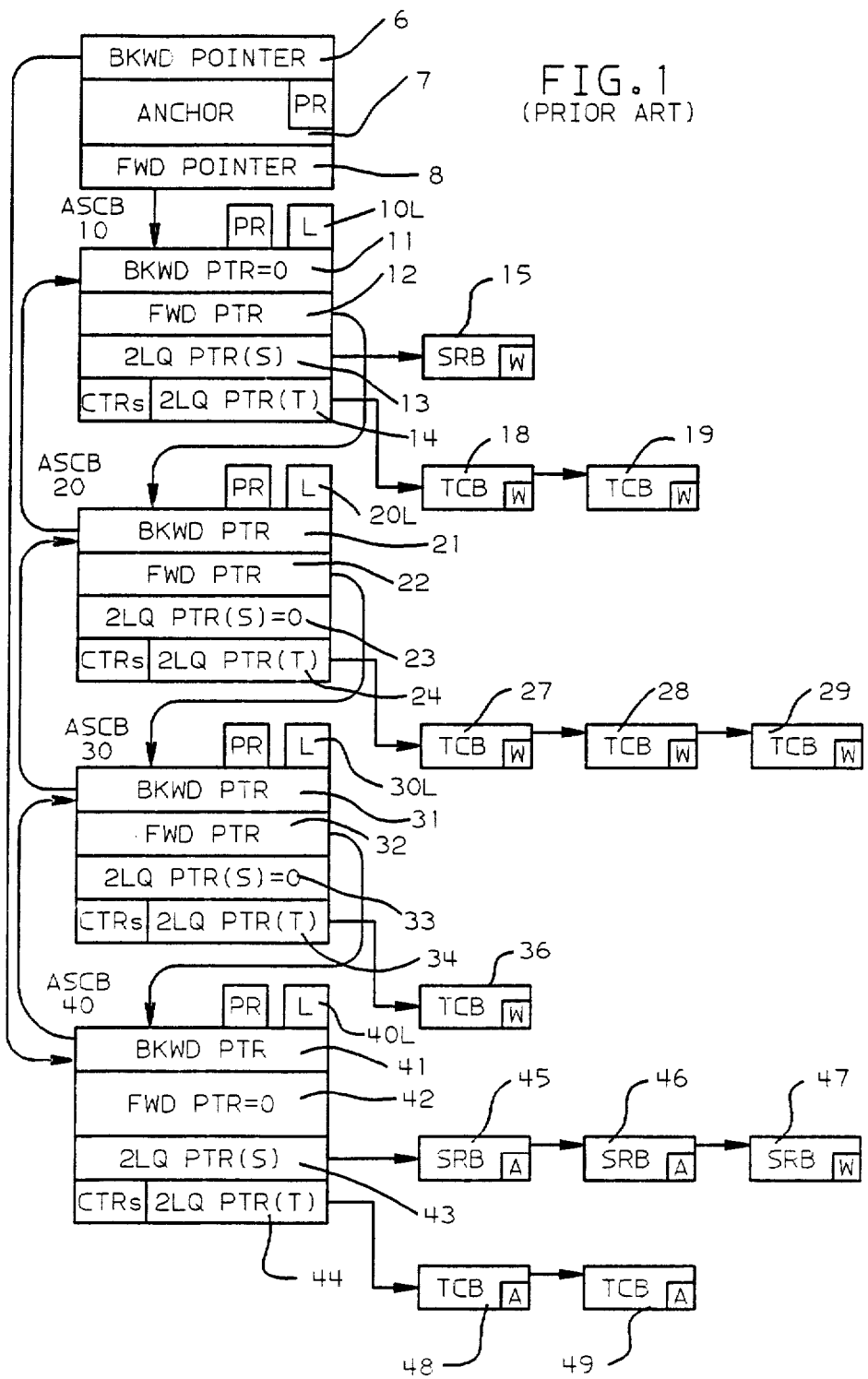
FIG. 1 illustrates a prior art background example of a prior dispatching queue, as an aid in understanding the relevant background of the invention.

In order to understand the detailed descriptions of the preferred embodiments to follow, FIG. 1 is provided to illustrate an example of a background prior art queue previously used in the IBM MVS program for supporting dispatching and other programming functions. It includes an anchor element 7 having associated backward and forward anchor pointer fields 6 and 8 that respectfully address the last and the first of a series of address space control blocks (ASCB) shown as ASCB 10 through ASCB 40, which are first level elements in a dispatching queue. At any given time in the operation of a system, there may be more or less than the number of ASCBs shown, and usually a much larger number exists, for example 100 or more. In general, there is an ASCB for each user currently using an MVS system.

Every ASCB in main memory is included within the queue used by a dispatcher program within the MVS system, whether or not the ASCB currently has any dispatchable element. An ASCB is only deleted from the queue when it leaves main memory, such as when user system use terminates (e.g. by user log off), or the ASCB is swapped out of main memory to auxiliary storage or extended storage (e.g. due to user inactivity). A swapped out ASCB is inserted into the queue only when it is swapped back into main memory, and then it is put into the queue even if it has no dispatchable block.

The ASCB is a complex control block having a large number of fields of which only a subset is illustrated which is pertinent to the background of the subject invention. In FIG. 1, each ASCB is a first-level queue element (1LQE) in a hierarchical dispatching queue. Except for the first and last ASCBs in the queue, each ASCB contains a non-zero backward pointer pointing to the preceding first-level element in the queue, and a forward pointer pointing to the next ASCB in the queue. For example, in ASCB 20, backward pointer 21 points to the beginning of prior ASCB 10, while forward pointer 22 points to the beginning of the next ASCB 30. The first ASCB 10 has a backward pointer equal to zero, and the last ASCB has a forward pointer equal to zero. But a backward pointer 6 in the anchor addresses the last element 40 in the queue.

Associated with each ASCB is a pair of second level queue (2LQ) pointers, and each points to the first block in a chain of second level control blocks used in the dispatching function. The first of the 2LQs with each first level element (i.e. ASCB) is a LIFO queue of service request blocks (SRBs) associated with its respective first level queue element. The first ASCB 10 has an associated SRB 15 addressed by the 2LQ PTR(s) (pointer) 13. Each SRB is a second level queue block (2LQB) which contains a forward pointer for locating any next SRB in its 2LQ chain. The last SRB of the chain has a chain end indicator value, which may be an all zero field.

The second of the 2LQs associated with each 1 LQE is a task control block (TCB) queue addressed by the second level queue pointer, 2LQ PTR(T) 14 in the first ASCB 10 in the queue. This 2LQ contains TCB elements that represent potentially dispatchable units of execution provided by the user of the associated ASCB. Thus, each TCB element is a second level queue block (2LQB) which contains a pointer to the next TCB in the TCB queue in priority sequence. Each new TCB is added in priority order in its 2LQ. The last TCB in the queue contains a unique value which, for example, may be all zeroes. Each TCB and SRB has a dispatchable state field. TCB is marked either waiting (W) when not dispatchable, or marked active (A) when it is dispatchable but not dispatched, or marked as dispatched (D) if it is currently dispatched.

When dispatched, an SRB is eliminated from its queue.

When a TCB or SRB is dispatchable but is not dispatched, it is marked as active (A) while it is in its 2LQ. When a TCB is dispatched and executing, and, it is left on the queue, it is marked as dispatched (D). If it is no longer dispatched and is waiting for an I/O request to complete before it can go into dispatchable state, it is marked as waiting (W). While a TCB is waiting, it gives up its CPU which can then be dispatch for another 2LQB. When a TCB again becomes dispatchable, it usually may be dispatched on any available CPU in the MP under the IBM S/370-XA architecture.

The 2LQ pointer fields and counter fields in a first level element (1LQE) indicate if there is any dispatchable block in the respectively addressed 2LQ, so that a search of the first level elements does not need to access any block in any 2LQ when no dispatchable element exists in that second level queue. Thus, the non-dispatchable state for any SRB queue may be indicated by setting its 2LQ PTR(s) to a zero value. The non-dispatchable state for the TCB queues is indicated in a 1LQE by counter settings (CTRs) associated with its 2LQ PTR(T). The CTR settings are used to compute a predetermined indicated count (e.g. zero) when there is no dispatchable TCB in that queue.

In the example of FIG. 1, all of the TCBs and SRBs illustrated are in wait state (W), except for SRBs 45, 46 and TCBs 48, 49 which are in active state A (dispatchable but not dispatched) and they are associated with the last ASCB 40.

Accordingly, in this example, whenever the MP system has any of its CPU's temporarily halt its processing of a currently incomplete task, the system will need to find another task to dispatch on that CPU; and the dispatcher program will search the queue to find a dispatchable SRB or TCB and dispatch it. Interrupts are disabled while the dispatcher is executing.

Each CPU may have a storage location with an address of a 1LQE in the queue, wherein these locations may be different in different CPUs in order to avoid having all CPUs interfering with the same element in the queue. Thus, in FIG. 1 the dispatcher may enter the initial 1LQE in the queue, for example, ASCB 10, access pointer 13 and test it for non-zero state to determine if any associated dispatchable SRB exists in its second level SRB queue. If none currently exist, it goes to pointer 14 and examines its counters (CTRs) to see whether a dispatchable TCB exists in that 2LQ. If a dispatchable TCB exists, the dispatcher searches the TCB queue for a TCB that has an active (A) flag indicating dispatchability. In this example, both 2LQs indicate no dispatchable 2LQB, and the dispatcher therefore uses forward pointer 12 to access the next ASCB 20.

In ASCB 20, the same process is repeated in which the second level pointer fields 23 and 24 are examined, and they also indicate no dispatchable 2LQB is available, whereupon the forward pointer 22 is used to access the next ASCB 30 which repeats the process and accesses ASCB 40.

ASCB 40 is similarly examined but its second level pointer fields indicate it has one or more dispatchable second level queue blocks, whereby 2LQ pointer 43 is used to locate the first SRB 45 on LIFO queue, which is dispatchable, and it is accessed and dispatched. Then SRB 46, TCB 48 and TCB 49 are dispatched in that order, provided that no existing or new SRB, or TCB of higher priority, becomes dispatchable between the dispatching of those 2LQBs.

The rate of dispatchability increases as the number of CPUs in the system increases, and/or as the number of concurrent system users increases, and/or the execution speed of the CPUs increases.

We will assume that while the dispatcher is searching the queue for a current requestor, other CPUs in the system become available concurrently, or soon thereafter, for the dispatch of a TCB or SRB. The reentrant dispatcher can simultaneously operate for all concurrent requestors. For each request, the dispatcher enters the queue, and searches through the queue of elements (i.e. ASCB's 10, 20, 30 and 40) until it finds one dispatchable 2LQB (i.e. SRB 45).

The point of the example in FIG. 1 is that for the dispatch of each SRB 45 and 46 and of each TCB 48 and 49, the dispatcher must spend system time searching through many first level elements (10, 20 and 30) not having any dispatchable elements.

As noted the use of a pointer into the queue for each CPU may reduce the searching but not eliminate it.

GENERAL OPERATION OF THE PREFERRED EMBODIMENT

It is a primary purpose of the subject invention to eliminate, or greatly reduce, the number of first level elements (1LQEs) not having any dispatchable elements. Thus, this invention will delete from the queue the elements 10, 20 and 30 in the prior art example previously discussed with FIG. 1. The invention thereby speeds up the searching process by eliminating the currently non-active elements from the queue, and it outweighs the additional effort and time of deleting and inserting elements when there are a large number of first level elements in main memory.

Figure 2:
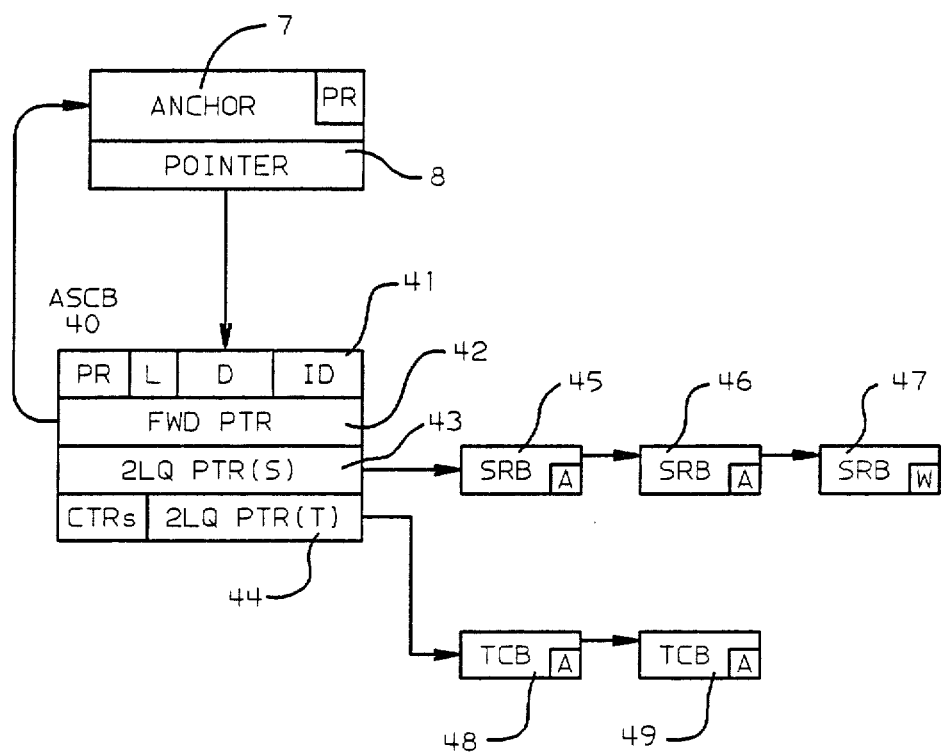
FIG. 2 is used to illustrate how the invention can improve dispatching operations in relation to the background example in FIG. 1.

FIG. 2 illustrates the result of operation of the invention under the same circumstances discussed above for FIG. 1. Accordingly, with this invention FIG. 2 shows only the first level element ASCB 40 in the queue, and it is directly addressed by the anchor pointer 8. (The invention has deleted from the queue, the inactive first level elements ASCBs 10, 20 and 30, because none of them have any dispatchable second level block.)

Consequently on queue entry, the invention would immediately access ASCB 40 with its dispatchable elements, and would not spend any system time searching through the sequence of first level elements 10, 20 and 30 in order to find element 40 as the first of the first level queue elements having a dispatchable element in a second level queue.

The last element in FIG. 2 has its forward pointer set to the address of the anchor to provide a circular queue. Thus, the forward pointer 42 contains the anchor address.

Hence by avoiding the searching of unfruitful elements, the invention's search time can be much faster than the prior art search time, without any increase in CPU speed, due to the deletion of the currently non-dispatchable elements from the queue.

FIGS. 3 and 4 are flow diagrams of a detailed example of the invention which allows any number of tightly-coupled processors (CPUs) in a MP to insert, delete, and reinsert elements in an ordered queue.

Since a plurality of processors can be searching the queue at the same time, insertions and deletions may occur in parallel in the queue for different processor requests.

Atomic system hardware capability equivalent to the IBM System/370 compare and swap instruction operation is used in the queue management by this invention.

Hence, the queue used by this invention may be an ordered circular queue, in which the last queue element has its forward pointer address the queue anchor. An anchor (header) contains the address of the first queue element, and it contains a forward pointer to any next first level queue element (LQE). The last first level element in the queue may so indicate by containing in its forward pointer the address of the anchor element. If the queue is empty, the anchor forward pointer addresses the anchor.

When a first level element is to be inserted into the queue, the relative position of the first level elements on the queue is determined by priority values contained in the priority field contained in each first level element. Thus, the priority value controls the position of the elements on the queue relative to other elements currently queued. The anchor element also has a priority field which is set with a value lower in priority than in any other element in the queue. For example, the priority range might be 255 to 1. 255 being the highest and 0 being the lowest, and 0 is the priority of the anchor. All elements with priority 10 should be searched in the queue before elements with priorities 9 through 1.

An element is inserted into the queue before the first currently queued element found during a search to have a priority value less than that of the element being inserted. Other priority schemes can be employed within the subject invention. The important point is that the insertion point can be found by searching the queue from the header until the application of a search rule dictates the insertion location. The priority of the header must be set according to the search rules for insertion. In the example above the priority of the header (0) was selected as a priority less than any possibly priority for the other first level elements since priority decreases with descending priority values. The selection process is reversed if the search rules are reversed, such as if priority decreases with ascending priority values.

In FIGS. 3 and 4, the deletion and reinsertion in the queue of any ASCB as a first level queue element (LQE) is managed by providing and controlling in each LQE: a first level forward pointer (FPTR), a forward pointer integrity lock bit (L), a first level element deletion indicator bit (D), and an identifier field (ID). The lock bit L is always tested before the delete bit D in this embodiment. The embodiment also uses some of the pre-existing ASCB fields: priority (PR) field, the second level queue pointers 2LQ PTR(S) and 2LQ PTR(T), and their associated dispatchability indicators and counters.

An element is indicated to be deleted from the queue when its delete bit D and its pointer lock bit L are both set to an on state.

An element is indicated to be in the queue while both bits D and L are in off state.

But the setting on of the forward pointer integrity lock bit L, while the element deletion indicator bit D is in off state, indicates the following: (1) only the requestor which set the L bit is allowed to change the forward pointer in that LQE, (2) no other requestor in the system is allowed to change the forward pointer, (3) all requestors searching in the queue are allowed to use that forward pointer as long as bit D is off, which indicates the forward pointer has not yet been changed, whether the L bit is on or off.

The following Table summarizes the operation of the L and D indicator bits in this embodiment:

TABLE

| L | D | ELEMENT STATE DESCRIPTION |
|---|---|---|
| 0 | 0 | State indicating the element is in the queue, and its forward pointer is changeable by any requestor. (Whenever an element no longer represents at least one unsatisfied service request, it may be deleted from the queue.) |

TABLE-continued

| L | D | ELEMENT STATE DESCRIPTION |
|---|---|---|
| 0 | 1 | Not used. |
| 1 | 0 | State indicating the element is in the process of being inserted into the queue or of being deleted from the queue, and only the current requestor of the element has the exclusive right to change its forward pointer. |
| 1 | 1 | State indicating a deleted element. (A requestor may insert a deleted element into the queue after the element indicates it represents at least one unsatisfied request for service.) |

Interference control during element insertion and deletion is obtained by having all of the above conditions for the L and D bits honored by all system requestors as coordinated by the processes of this invention. This alleviates the risk of any forward pointer undergoing change in a way that may unwittingly cause it to no longer address the next element in the queue, which may break and destroy the queue and result in the failure of the entire MP system.

In an MP when parallel access is allowed (e.g. no serializing lock), it is not unusual for the same first level element to be accessed at the same time on behalf of different CPUs, wherein multiple CPUs may be trying to change the element. It is a purpose of this invention to prevent damage to the queue by parallel asynchronous change attempts.

The system dispatching program accesses the queue on behalf of each requestor. The dispatch is comprised of reentrant readonly code which can be simultaneously executing on different CPUs. When the pointer lock bit L is set on immediately prior to deleting a first level element from the queue, it warns the dispatcher not to attempt change in the forward pointer of that element on behalf of another requestor.

Nevertheless, special conditions exist that make it possible for the dispatcher to make changes to the same queue element at almost the same time on behalf of different CPUs, wherein the special conditions cause the protocol provided by the setting of the L and D bits to be insufficient. System integrity requires that the dynamic operation of the L and D bits be supplemented by additional integrity controls, including the observation of changes to the ID field and the use of a saved forward pointer field of the prior element to detect changes to the queue that would make insertion or deletion inappropriate.

A deleted element in its static deleted state is flagged as no longer on the queue by the on state of both the delete bit D and the lock bit L in the element. When both the lock bit L and the delete bit D are on, they indicate that the element is not on the queue, i.e. the element's forward pointer should not be used for addressing any next queue element. Therefore, the on states for both the delete bit D and lock bit L provide an unambiguous test for determining whether an element is or is not in the queue. Also the delete bit D cannot be on without the lock bit L being on.

Whenever the operating system (OS) handles an I/O interrupt for an ASCB (i.e. LQE), the OS checks if the interrupt handler has made a task dispatchable for an associated LQE. If a task is made dispatchable, the TCB of the task has its dispatchability flag set to active state (A), and OS checks the ASCB to determine if it is on or off the queue. If it is off the queue, it must be inserted into the queue, and it is called LQE(I) during the insertion process. Then box 103 is entered in FIG. 3A to attempt the insertion of LQE(I).

When a first level element is being inserted into the queue, it is expected that its D and L bits are both in on state. If they do not both continue with that state during the insertion process, it indicates another CPU has, or is trying, to insert that element on the queue, and the process may terminate for the current requestor CPU; but any dispatchable second level block currently found may be dispatched on the current requestor CPU or another CPU.

Any 1LQE may be deleted from the queue whenever the 1LQE no longer has any associated dispatchable 2LQB.

The insertion and deletion process must be capable of detecting unusual situations that have potential for damaging the queue. When inserting an element into the queue, many special contention scenarios are possible and some could destroy the queue unless they are guarded against. For example, it is possible for an element to be deleted for one CPU, while another CPU is attempting to insert it.

Control of the ID field is used to detect some special conflict situations by indicating which requestor is causing a 1LQE to be undergoing change as it is being inserted or deleted into or from the queue. Thus, the posting of another requestor's ID into that field during the dynamics of an insertion or deletion attempt by a different requestor will be recognized, so that one of the conflicting requestors can end its insertion or deletion attempt. The dispatcher program stores the ID of the CPU that requests another program to execute before attempting to dispatch a 2LQB.

The ID field in a 1LQE is also used by the dispatching program to indicate that a new 2LQB is being attached to that 1LQ element when the dispatcher stores a unique value R into the ID field in the 1LQE to indicate the addition of a dispatchable 2LQB.

Hence, one of the first operations in using any 1LQE is the storing of a requestor CPU ID or R value into the ID field (whether or not 1LQE insertion or deletion is being attempted). And one of the last operations in deleting any 1LQE (before indicating that an attempted deletion is successfully completed) is to check the element's ID field against the current requestor's ID comparing them to determine if the element's ID field was changed.

The setting of a forward pointer lock bit on and the delete bit off guarantees no change to the forward pointer. Therefore, the lock bit and delete bit are set as described above after determining that insertion or deletion will be attempted.

The states of the L and D fields are checked more than once during the dynamic process of inserting or deleting a 1LQE, in order to determine if the insertion or deletion of the 1LQE can be done.

Communicative detection of contention is performed by all interfering requests viewing the same set of ID, L and D fields in the elements of a queue. It is essential that contentious changes to any forward pointer occur in a manner that informs all contenders, so that every contender will know if a change has occurred.

LEGEND USED IN FIGS. 3 AND 4

1LQ is a first level queue.
2LQ is a second level queue. One or more second level queues are associated with each 1LQE.
1LQE is a first level queue element in or out of the dispatching queue.
2LQB is a second level queue block in or out of the dispatching queue hierarchy.
Element I is a 1LQE to be inserted into queue.
Element P is a 1LQE examined during the search for an insertion location which may become the element immediately prior to the insertion location when it is found.
Element P+1 is the 1LQE in queue immediately after element P during the search for an insertion location.
Element C is the current 1LQE in the queue being searched for a dispatchable 2LQB, and it is a potentially deletable 1LQE.
ID is the requestor identification field in a 1LQE.
The ID field receives a CPU identifier or an indicator of new dispatchability in an associated 2LQ.
FPTR is the forward pointer field in each 1LQE.
L is the forward pointer lock field in each 1LQE.
D is the deletion indicator field in each 1LQE.
PR is the priority field in each 1LQE.
Subscript (I), (P), (P+1), or (C) on any element or field identifies the subscript condition on the particular element or field.

DETAILED DISCUSSION OF FIGS. 3A, 3B AND 3C

FIG. 3A shows the process of inserting a new or deleted first level element, 1LQE. A new element 1LQE(I) is inserted into the queue when a user logs onto the system, and provides a dispatchable task. Then the dispatcher needs to insert the new 1LQE(I) into the queue. Box 101 is entered to begin this process.

The insertion of a previously deleted element 1LQE(I) into the queue is started when the dispatcher has provided a dispatchable 2LQB onto a first level element 1LQE(I) that had no dispatchable second level block, 2LQB.

Insertion is started at box 103 in FIG. 3A whenever the dispatcher is signalled that a second level block has become dispatchable (e.g. by an I/O interrupt indicating completion of its I/O request). The addressed 1LQE may be obtained by the dispatcher checking a table of all 1LQEs to obtain the 1LQE(I) address. Both new and deleted 1LQEs are in the table of all 1LQEs, e.g MVS address space vector table.

Box 101 represents the operation of providing a new 1LQE for insertion into the queue. The method used in the prior art to build a 1LQE element for use in prior MVS dispatchers is also the method used by this invention to construct the element before entering box 101.

After box 101 receives addressability to a new element I, box 102 sets on the flag fields L(I) and D(I) in the new element to prepare it for insertion. Then box 108 sets an identifier field ID(I) in the 1LQE(I) to a unique value R, which indicates that a newly dispatchable second level entry is associated with that 1LQE(I).

Box 106 represents the operation of accessing an existing element 1LQE(I) which was possibly deleted from the queue. It is presumed that the method shown in FIGS. 4A, 4B and 4C was previously used to delete the element.

Box 106 goes to box 108 which sets the ID field in that 1LQE(I) to the unique identifier R to indicate 1LQE(I) has a dispatchable block. Then box 112 saves the value of forward pointer FPTR(I) in a field separate from element I so that the save FPTR(I) will have a creditable value regardless of what happens to the content in FPTR(I) due to subsequent interference.

Box 112 starts a process for determining whether element I is (at this instant of time) in the queue or not, as indicated by the current settings of its L and D fields, which could have been changed by another CPU. If element I is currently in the queue (i.e. no longer in delete state), its L field will have been set off, and the exit 116 is taken from the queue to end the current insertion attempt. If the L bit is on, the dispatcher continues to attempt to insert 1LQE(I) into the queue.

Interference may occur because concurrently while the insertion process of FIGS. 3A, 3B and 3C is operating for the current requestor CPU (having the R value identifier currently set in the ID field of the current element 1LQE(I), another requestor CPU may be attempting a concurrent deletion process and/or the insertion process which may interfere with the insertion operation for the current requestor CPU.

Accordingly, box 112 saves the forward pointer, FPTR(I), of the element in a separate field which will be available unchanged at the end of the interference detection process, regardless of any interference with the respective element. Then box 115 tests the state of L(I) which should be set on unless element I is already on the queue. If L(I) is set off, the process takes exit box 116 to stop the requested insertion process, since it is assigned in the queue.

But if box 115 finds the state of L(I) is set on, box 118 is entered to test the state of field D(I), which also should be set on if the element I is in a deleted state. If these conditions exist, then box 121 is entered.

And if box 118 L(I) is set on and field D(I) is set off, a contending deletion or insertion process is thereby indicated to be underway and is about to complete. It is necessary to wait to see if the deletion process, or insertion process, will complete by waiting for the D(I) field to be set on by the deletion process, or the L(I) to be set off by the insertion process. This is done by looping back to box 112.

Box 121 does another test of the states of the forward pointer FPTR(I), L(I) and D(I) after any and all spin wait period(s) are over before continuing the insertion attempt by finding that FPTR(I) is unchanged, that both L(I) and D(I) are in on state, and in the same atomic operation then setting D(I) to off state in box 122. The atomic operation of boxes 121 and 122 is done by executing a compare and swap instruction.

The atomic operation includes the FPTR(I) change test done by comparing the saved field of box 112 with the FPTR(I) field in the 1LQE(I). If they compare unequal or if either L(I) or D(I) is off, the no exit is taken from box 121 to box 112 to spin wait until all required conditions exist for box 121 at which time box 122 is executed and box 130 is entered.

The purpose of the atomic operation of boxes 121 and 122 is to set D(I) off, while L(I) is in an on state, in a manner that avoids any possible interference with these settings, or with FPTR(I), from any other requestor. The D(I) off and L(I) on combined settings will communicate to all other requestors that the current requestor must have the exclusive capability to change FPTR(I), D(I) and L(I), so that no other requestor will attempt to change them. The hardware serialization of the atomic operation assures that only the current requestor, and no other requestor, will change FPTR(I), D(I), or L(I) while the current requestor is inserting element I into the queue.

The use of the combinatorial off and on state of flag fields D and L respectively in the preferred embodiment is but one way to accomplish this communication purpose.

Whenever any of these specific techniques is used for providing the communicative indication with an element to be inserted, the other requestors will honor such indication by not changing the forward pointer or pertinent flag fields in the element while it has that indication. However, the other requestors are not prevented by such indication: (1) from reading such indication, or (2) from using, without change, the forward pointer in searching the queue, or (3) from using or changing other non-pertinent fields in the element.

Box 130 makes a search of the queue to find an insertion location in the queue for 1LQE(I).

FIG. 3C illustrates details of the search process in box 130. The search begins at the anchor and accesses two consecutive first level elements P and P+1 in the order of the queue during each iteration, looking for the first 1LQE(P+1) that has a priority less than the element being inserted, 1LQE(I). This is because the priorities in this example range from 255 to 0, with 255 being the highest priority, and 0 being the lowest priority and the priority assigned to the anchor element. Therefore during the search, the first element P+1 found to have a priority less than element I will stop the search, because the insertion point will then be between the then current elements P and P+1. Note in the special case of an empty queue, P equals P+1 and is the anchor address.

In FIG. 3C, the search begins at box 123 in which the dispatcher accesses the queue anchor at an address known to the dispatcher program. The queue anchor is considered the first 1LQE in the queue for the purpose of the search, and it is initially the current element P in the search.

Next, box 126 stores the address of 1LQE(P), called ADDR(P), and at the beginning of the search is the address of the anchor. Also, box 126 stores the value of the forward pointer FPTR(P) in a place separate from element P (e.g. in a general register or separate storage area) which will not be changed by any possible interference with element P, so that this saved value may later be used to detect any interference change to FPTR(P) within element P. Then box 127 accesses the next element 1LQE(P+1) at the saved address FPTR(P).

Each of the different fields in any element 1LQE is located at a particular index value from the beginning of the element. The same type of field has the same index value in all 1LQE elements. Thus for box 128, the PR fields are respectively accessed at the same index value in elements I and P+1 when they are compared.

Box 128 compares the priority of the element 1LQE(I) being inserted with the priority of the accessed element 1LQE(P+1). Each 1LQE, whether in or out of the queue, has a priority field PR with a content representing the current priority of the respective element. Priority field PR(I) is in element 1LQE(I), and priority field PR(P+1) is in element 1LQE(P+1).

If PR(P+1) is found not less than PR(I), box 129 is entered to begin the next iteration in the search. Box 129 redefines element P+1 as element P using the saved value of box 126 for the next iteration in the notation used in FIG. 3C. Thus the redefined element 1LQE(P+1) becomes the current 1LQE(P) in the next iteration.

At the beginning of the next iteration, box 125 uses the forward pointer FPTR(P) in the now current element P for locating the next element P+1, which is now the current element 1LQE(P+1) in the queue. Also box 125 accesses fields L(P) and D(P) in the now current element P.

Then, boxes 131 and 132 check the states of fields L(P) and D(P) to determine if any interference is occurring with the current element P at this point in the search. For example, if current element P is found to have L(P) on and D(P) on indicating that element P is no longer on the queue, the element P may not be relied on for the insertion operation.

If an interfering process operating on the element P is a deletion operation (to be described in FIGS. 4), the pointer lock field L(P) may have been set on in preparation for the interfering deletion, but the pointer in that element may still be validly read and used as long as delete field D(P) has not yet been set on. That is, the setting on of the pointer lock field L only prevents the pointer from being changed for another requesting CPU, but still allows its use. Thus the value of the forward pointer FPTR(P) can still be relied on as long as the D(P) field is not set on in that element. But the FPTR(P) should not be relied on after the D(P) field has been set on.

Since element P was initially found in the queue, it is currently expected to still be in the queue, and therefore its fields L(P) and D(P) are both expected to be in off state. Therefore if box 131 finds L(P) off, its forward pointer is not being changed, and it can be used during the search. Or if box 131 finds L(P) on and box 132 finds D(P) off, the element has not yet been deleted, and FPTR(P) can still be used in the search. But if box 131 finds L(P) on and box 132 finds D(P) on, the element is no longer in the queue, and its FPTR(P) is not to be relied on, and it should not be used during the search; in this case the search starts over again by going from box 132 to box 123, at which the search begins again, looking for an insertion location.

Whenever during a search, box 128 finds PR(P+1) is less than PR(I), the insertion location is thereby found between the current elements P and P+1, and the process goes to box 133 in FIG. 3A, which prepares element I for its insertion. The preparation includes moving the address of element P+1, i.e. ADDR(P+1), into the forward pointer field in element I, i.e. FPTR(I); and setting off field D(I) and setting on field L(I).

Then the process uses connector 3 to go to FIG. 3B, in which box 134 begins a subprocess that checks the interference state of the prior queue element 1LQE(P) before making the insertion of 1LQE(I), since the insertion is dependent on element P having a valid forward pointer FPTR(P) for addressing its next element P+1, because this pointer will (after the insertion) be used by element I to point to element P+1.

Accordingly, box 134 accesses element P with the address ADDR(P) currently stored in a save location by box 126 in FIG. 3C; this obtains FPTR(P) and fields L(P) and D(P)in element P. Both L(P) and D(P) must be off for an insertion to be made. Box 135 tests the state of field L(P), which must be off if FPTR(P) is not being changed, but this is an insufficient test for finding no change to element P. Then the state of FPTR(P) is tested by box 136 comparing FPTR(P) with the stored value of FPTR(P) previously done by box 126 in FIG. 3C. If they compare equal, FPTR(P) has not changed, which is an indication that element P has not been interfered with during the current insertion process. If no changes occurred, box 138 is executed to perform the insertion of element I into the queue. Box 138 inserts the element 1LQE(I) by setting the FPTR(P) field in preceding element P to the address of I, i.e. to ADDR(I).

An atomic instruction, such as the S/370 compare and swap (C&S) instruction, is used to simultaneously perform the final check and insertion by boxes 135, 136 and 138 to assure that there will be no interference between the operation of these boxes to assure the insertion of element I free of interference from any other requestor.

When the insertion process completes for the current insertion operation, field L(I) is set off by box 141 to indicate 1LQE(I) is in the queue.

However if box 135 found the field L(P) is in an on state, no insertion can then be made because the prior element P is undergoing change for a potential deletion. Then field D(P) is checked by box 137 to determine if D(P) is set off, in which case the process can go into a spin wait loop back to box 134 with the possibility that the field L(P) might go off if the potential deletion does not happen (see boxes 271, 279 and 291 in FIG. 4B). In such case, the insertion will be made after a short wait. But if D(P) is found on by box 137, the deletion of element P has already occurred; then box 139 is entered to save the current value of FPTR(I) in preparation for searching the next element in the queue and connector 1 is taken to box 130 in FIG. 3A to begin another search to find a usable insertion point for 1LQE(I). If box 136 finds FPTR(P) has changed, the insertion location found for element I cannot be relied on, and another search must be made after going to box 139 to save FPTR(I); and then taking connector 1 to begin a search for another insertion location.

DETAILED DISCUSSION OF FIGS. 4A, 4B AND 4C

FIG. 4A shows the process of the dispatcher searching the queue for a dispatchable 2LQB; and, whenever appropriate, deleting a first level element, 1LQE, from the dispatching queue whenever there is no remaining dispatchable second level blocks, 2LQB, associated with any searched first level element, 1LQE. Thereafter, a subsequent search of the queue for another 2LQB will not waste time searching through any first level element(s) that cannot provide any dispatchable second level block. No deletion operation from the queue will be performed on any first level current element 1LQE(C) if during the search it is left with at least one dispatchable second level block, 2LQB.

Box 201 represents the start of a search of the queue for a dispatchable second level block, 2LQB. Then box 208 accesses the first current 1LQE(C) of the queue which initially is the first element after the anchor element, and the first 1LQE is accessed with the anchor's forward pointer FPTR(P). The content of FPTR(P) is the address of C, i.e. ADDR(C), which is also saved by box 208 as SAVED ADDR(C) in a separate save area independent of the queue, so that it cannot be affected by any queue changes.

Next, box 219 is entered to perform a comparison test on the address of the current element C to determine if the end of queue has been reached by comparing ADDR(C) to the anchor address. If they are equal, the end of the queue is reached, and if equal for the anchor's FPTR(P), then the queue is empty, i.e. the forward pointer points to the anchor.

If test 219 finds the end of the queue has not been reached (compares unequal), box 221 is entered. Box 221 sets the ID(C) field in the current 1LQE(C) to the identifier of the CPU for which the dispatcher is making the current search for a dispatchable second level block.

Then, box 226 searches each second level queue 2LQ(C) of the current 1LQE(C) in an effort to find a dispatchable 2LQB(C). Then a series of tests by boxes 231 and 236 are made to determine if any dispatchable 2LQB remains for the current 1LQE. Box 231 determines if any dispatchable 2LQB was found for this 1LQE(C) by the search of box 226. If yes, test 236 is entered to determine if this 2LQB(C) was the last dispatchable second level block of this 1LQE(C), leaving no remaining dispatchable 2LQB for this 1LQE. If box 236 indicates this is not the last dispatchable 2LQB(C) on this 1LQE(C), the current 1LQE should not be deleted from the queue, so that exit 241 is taken to dispatch the found 2LQB(C) and end the process for the current request. If box 236 indicates yes (i.e. the last 2LQB was found), then the deletion of the 1LQE(C) proceeds because there are no more 2LQB's on this first level element, and box 246 is entered.

Box 246 accesses FPTR(C), L(C) and D(C) in the current 1LQE(C). Then box 248 saves FPTR(C) in a place independent of element C, so that the SAVED FPTR(C) will not be changed if FPTR(C) is changed in element C. Connector 4 is taken to continue the element deletion process on FIG. 4B.

Figure 4B:
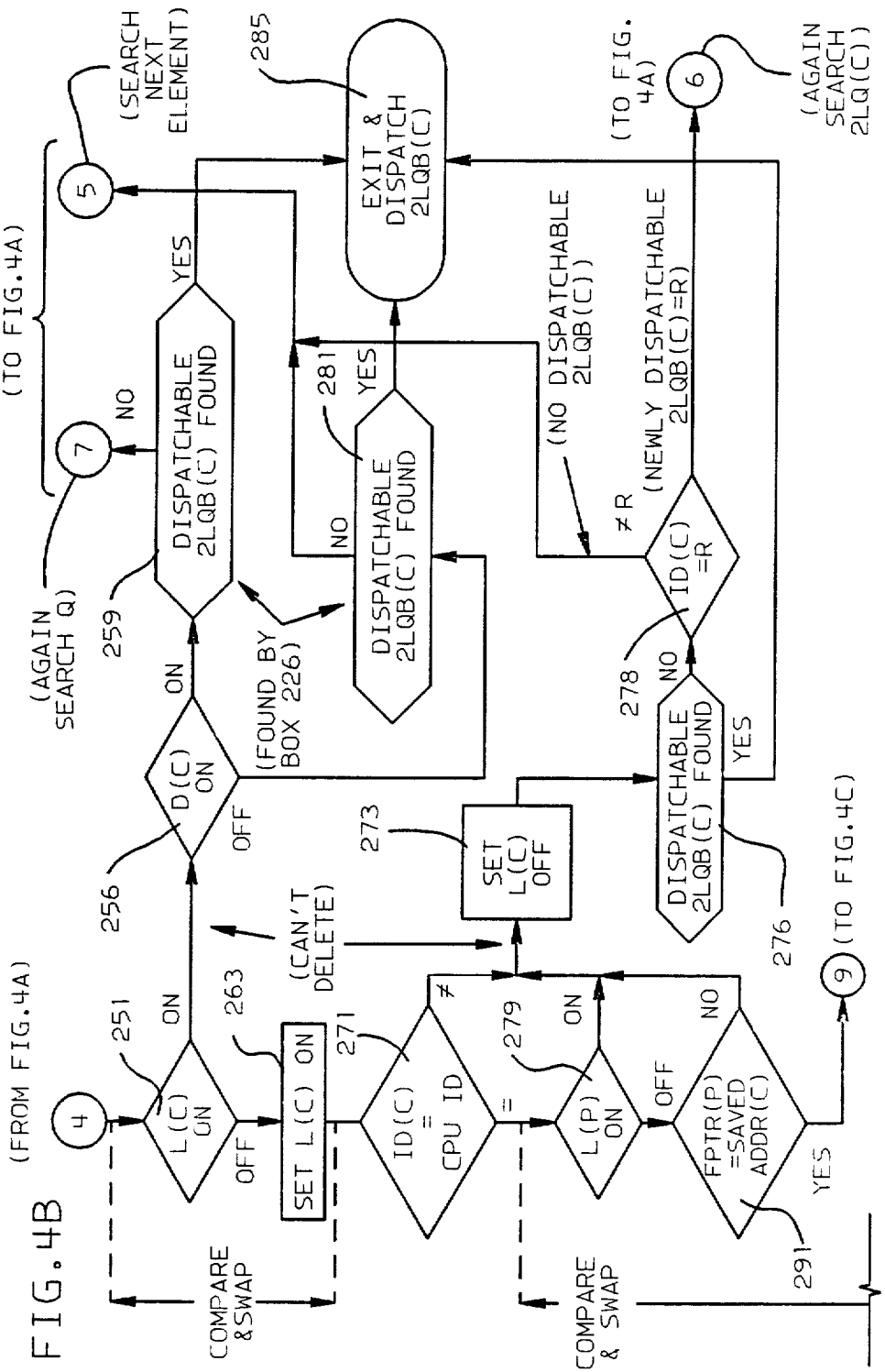

In FIG. 4B, boxes 251 tests if L(C) is off, and if off box 263 sets L(C) on. Boxes 251 and 263 are simultaneously executed by an atomic instruction, such as the S/370 compare and swap (C&S) instruction, to simultaneously perform the check on L(C) and the setting of L(C) to assure that there will be no interference with the state of L(C) by any other requestor between the time it is tested and the time it is set, that might invalidate these critical operations. If the atomic operation is successful, box 271 is entered with L(C) set on by the current requestor to indicate to other requestors that they should not change FPTR(C).

The L(C) and D(C) in boxes 251 and 256 tests determine if the current element may have been deleted at the request of another CPU. If L(C) is on and D(C) is off, C is in the queue but is not available for deletion processing, because another CPU is attempting to delete the element C. What happens after box 256 is dependent on whether any dispatchable 2LQB was found by the search of box 226.

Then box 271 checks to determine if any other CPU may now be interfering with this element by comparing the identifier of the currently requesting CPU (i.e. CPU ID) and the ID(C) field (stored in the current element C by box 221 in FIG. 4A). If they are still the same (i.e. equal), the attempt to delete element C continues by entering box 279.

To do the deletion, it is essential that the prior element P have a usable FPTR(P), since FPTR(C) will be moved from element C into element P to perform the deletion. Boxes 279 and 291 test the interference state of FPTR(P) before box 292 performs the deletion of 1LQE(C) by copying FPTR(C) into FPTR(P). The test by boxes 279 and 291 and the deletion by box 292 are all done simultaneously by an atomic instruction, such as the S/370 compare and swap (C&S) instruction, to assure that there will be no interference by any other requestor between the operations of these boxes, which could invalidate these critical operations. If it finds that L(P) is off and that the address of C (ADDR(C)) equals the implicitly SAVED FPTR(P) from box 208 or 284, the deletion by box 292 is made.

Figure 4C:
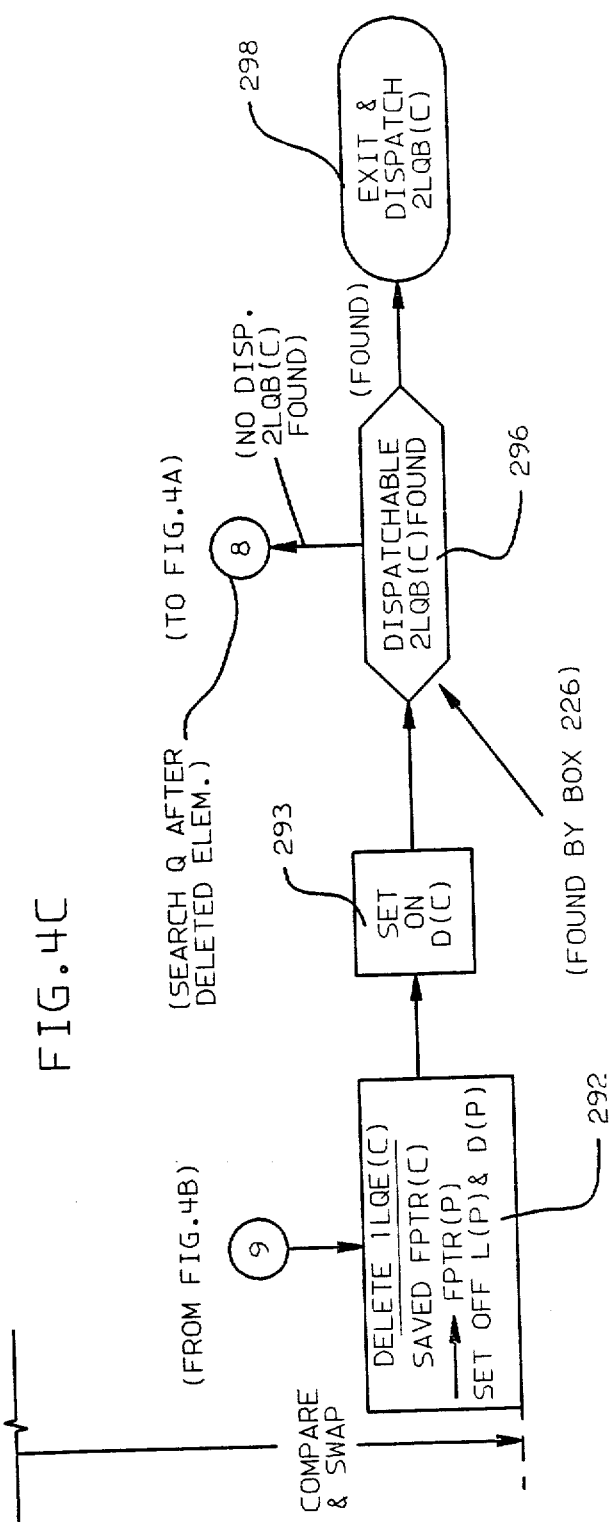

After the deletion of the current 1LQE(C) is successfully completed by box 292 in FIG. 4C, box 293 sets on field D(C) in the deleted element C to indicate the fact of its deletion to all other dispatcher requestors.

Then box 296 tests if any dispatchable 2LQB(C) was found by the search by box 226 for the current CPU request. If a dispatchable 2LQB(C) was found, the exit 298 is taken whereby the dispatcher program dispatches it on the requesting CPU in the conventional manner.

Boxes 271, 279 or 291 detect if a recent interference condition occurred to element P or C. No deletion of 1LQE(C) can be made if the prior element's FPTR(P) does not still point to 1LQE(C) or if new 2LQBs have been indicated as dispatchable for 1LQE(C). Then box 273 is entered to end the process for the current request.

In more detail, box 271 detects if another CPU ID or R value has replaced the current requestor's CPU ID stored into element C by box 221. An ID change would indicate interference. An R value indicates newly dispatchable 2LQB(s). Boxes 279 and 291 detect the existence of interference with the prior forward pointer FPTR(P) by accessing element P to determine if its pointer lock L(P) has been recently set on, or if its value of FPTR(P) has changed. Any element in the queue may be deleted or inserted, to cause a change in the FPTR within any other element. The test in box 291 depends on the current pair of elements that become elements P and C on each iteration of the process in FIGS. 4, in which the current 1LQE(C) becomes the next iteration's 1LQE(P). Each next iteration of the queue search goes to the next element and saves the address of the last non-deleted element C as the prior element P in the separate place as SAVED ADDR(P) and its FPTR(P) is saved as SAVED ADDR(C) by boxes 283 and 284 in FIG. 4A for the next iteration. Box 291 uses this SAVED ADDR(P) to access 1LQE(P) and compare the current value in its FPTR(P) with the currently SAVED ADDR(C), which should compare equal unless there was interference, such as if element P was recently deleted or if another element was recently inserted prior to element C, etc.

If box 291 finds they compare equal, connector 9 is taken to box 292 which performs the deletion of 1LQE(C) in the same compare and swap instruction. But if box 291 finds an unequal compare, interference is indicated and the deletion of the current element C cannot be made.

The result of a finding of interference by any of boxes 251, 271, 279 or 291 will cause different types of operations, depending on whether or not a dispatchable 2LQB(C) was found by box 226. Thus, when box 251 finds L(C) on, then D(C) is tested by box 256 to determine if element C was deleted by another requestor. If box 256 finds field D(C) is set on, the element C is indicated to have been deleted by an interfering process. Then the current process will terminate its attempt to delete element C. Then box 259 is entered to test if a dispatchable 2LQB(C) was found by the last iteration of box 226. If box 259 indicates a dispatchable block was found, the yes output is taken from box 259 to exit box 285, wherein the process is ended for the current request by dispatching the found dispatchable block on the currently requesting CPU. But if box 259 indicates no dispatchable block was found, the search continues for a dispatchable block; and connector 7 is taken to box 201 in FIG. 4A to start a new search of the queue at the anchor element.

But if box 256 finds field D(C) is set off, the L(C) field (tested by box 251) was recently set on by another requestor to indicate interference with the current element C (which is still in the queue since D(C) has not yet been set on), in which case the current requestor's process will not delete element C. Then box 281 is entered to test if a dispatchable second level block was found by box 226. If no dispatchable block was found, exit 5 is taken to box 284 in FIG. 4A to continue the search with the next first level element in the queue. If a dispatchable block was found, box 281 takes its yes exit to box 285 which ends the current process by dispatching the found 2LQB(C) on the requesting CPU.

On the other hand, before box 273 is entered from any of boxes 271, 279 or 291, field L(C) is set to the on state (by box 263) for the current process to indicate that the forward pointer FPTR(C) in the current element C is locked and should not be changed by any other requestor. Therefore when any of boxes 271, 279 or 291 found interference exists, box 273 is entered to set L(C) to off state to indicate FPTR(C) is available for being changed by other requestors. Subsequent operations are dependent on whether a dispatchable 2LQB(C) was found by box 226, which is tested by next box 276. If any was found, the yes output is taken to exit 285. If no dispatchable block was found, box 278 is entered to test if field ID(C) was recently set to value R by the operating system. The box 278 test is used for the special case where no dispatchable 2LQB(C) was found in the last search by box 226. The box 278 test for value R, which indicates that a dispatchable 2LQB(C) now exists which did not exist for element C during the last search by box 226, making another search of element C by box 226 desirable. Thus if a dispatchable 2LQB(C) is indicated by box 278 to have been added to one of the second level element has been provided, connector 5 is taken to box 282 in FIG. 4A to search the next element on the queue for a dispatchable block.

When connector 5 is taken to FIG. 4A, box 282 is entered to redefine the current element C as the prior element P in the next search iteration, when the search goes to the next first level element in its effort to find a dispatchable second level block, when no dispatchable second level block has yet been found and the entire queue has not yet been searched. Box 283 copies the previously saved SAVED ADDR(C) into the current SAVED ADDR(P), which are located in the separate save area. Then box 284 is entered to copy the SAVED FPTR(C) last saved by box 248 into the current SAVED ADDR(C) in the separate save area.

As previously stated these save items are saved in a general register or a storage area separate and independent of the queue elements and which will not be changed by queue interference. Next, box 286 uses the SAVED ADDR(C) saved by box 284 to address the next current 1LQE(C), and continue the next iteration.

Box 219 is entered to test if the element C accessed by box 208 or 286 is the last element of the queue, which is indicated by ADDR(C) being equal to the address of the anchor element. If equal, the process is ended by going to exit 288.

The following Tables A and B show that at the same time CPU 2 is activating a 2LQB of 1LQE(Y) with the process in FIG. 3, CPU 1 is using the process in FIG. 4 to search the queue for a dispatchable block and is examining the same 1LQE(Y). Table A shows how the ID field of 1LQE(Y), while it is on the queue, ensures that any newly activated block of 1LQB(Y) will be dispatched before 1LQE(Y) is deleted from the queue. Table B shows the failure of priority dispatching if the function of the ID filed is eliminated in the processes of FIGS. 3 and 4.

TABLE A

| Time | CPU 1 Operation Performed | CPU 2 Operation Performed |
|---|---|---|
| t | Start search for active 1LQE; Enter Box 201 | |
| t+1 | Access 1LQE(Y); Store CPU ID into ID(Y); Box 208 and 221 | |
| t+2 | Search for active SRB with 1LQE(Y); None found; Box 226 | I/O interrupt occurs for a SRB associated with 1LQE(Y) |
| t+3 | Search for active TCB with 1LQE(Y); Box 226 | Activate SRB for 1LQE(Y); Box 103 |
| t+4 | TCB found for 1LQE(Y); Box 231 | Store R value in ID(Y); Box 108 |
| t+5 | Found TCB is last active TCB for 1LQE(Y); Box 236 | Test L(Y); Find L(Y) is off indicating 1LQE(Y) is on the queue; Box 115 |
| t+6 | Set L(Y) on for deletion attempt; Boxes 251 and 263 | 1LQE(Y) is indicated on the queue; stored R value prevents any impending deletion of 1LQE(Y) from happening; Box 116 |
| t+7 | Test if ID(Y) = CPU ID; cannot delete 1LQE(Y) since ID(Y) changed since t+1; Box 271 | |
| t+8 | Set L(Y) off; Box 273 | |
| t+9 | Dispatch found TCB leaving 1LQE(Y) on the queue; Boxes 276 and 285 | |

TABLE B

| Time | CPU 1 Operation Performed | CPU 2 Operation Performed |
|---|---|---|
| t | During search for active 1LQE access 1LQE(Y) | |
| t+1 | Search for active SRB with 1LQE(Y); none found | |
| t+2 | Search for active TCB with 1LQE(Y); | I/O interrupt occurs for a SRB associated with 1LQE(Y) |
| t+3 | TCB found for 1LQE(Y) | Activate SRB for 1LQE(Y); Test L(Y); found off indicating 1LQE(Y) is on the queue |
| t+4 | Found TCB is last active TCB for 1LQE(Y); (No indication to CPU1 of SRB activation by CPU2 at t+3) | |
| t+5 | Set L(Y) on for attempt to delete 1LQE(Y) | Note: CPU 2 activation of the SRB at t+3 fails to prevent CPU 1 deletion of 1LQE(Y) with an active SRB due to lack of indication of SRB activation to CPU 1 |
| t+6 | Delete 1LQE(Y) | |
| t+7 | Set on D(Y) indicating 1LQE(Y) has been deleted from the queue | |

The proper operation for a hierarchical queue is made feasible by providing in each first level element an activity indicator for indicating whenever an associated second level block is activated. The indication that a second level block has been activated must be set (to the R value) prior to checking if the associated first level element is in or out of the queue.

Furthermore, the CPU for searching the queue for a dispatchable 2LQB must also set the indicator to a value unique to the CPU that it is processing for and unique from the activated value (R value) prior to examining a 1LQE for a 2LQB to process. As the CPU examines the 2LQBs, a determination may be made that the associated 1LQE should be deleted because of an absence of activated 2LQBs, or because the last 2LQB is selected for processing. If a 2LQB is activated by another CPU at a point in time after the 2LQB examination and the decision point to delete the associated 1LQE, the CPU activating the 2LQB will update the ID field. The CPU searching the queue will signal its intention to delete the 1LQE by setting L(I). If the CPU finds the L(I) lock indicator set, the intention by the other CPU to delete will be known and the CPU enabling the 2LQE will continue checking the L(I) indicator and the D(I) indicator. If the D(I) indicator subsequently is detected as set, the enabling CPU must insert the 1LQE into the queue.

If the CPU activating work checks L(I) and finds it off, it can assume that L(I) is queued. Since the CPU searching the queue must first set on L(I) and then check the ID(I) for any unique value prior to deleting the 1LQE(I), it will detect the activation of any 2LQB by another CPU because ID(I) will be changed. This prevents deletion of a 1LQE initially sensed as inactive by the current CPU when thereafter the 1LQB is activated during the window of time between setting on its L(I) and the deletion of the 1LQE.

Hence, setting the active indicator in a first level element (by putting the value R into its ID field) ensures that the element will not be improperly deleted while during this vulnerable time window of non-atomic operations.

It is noted that the ID field need not be operated or tested as described above if it is set and reset atomically during changes to the forward pointer lock bit and delete bit. A requestor searching the queue would then first atomically check for the forward pointer lock field being off; and when L(I) is off, the requestor continues the atomic operation by determining that the ID field is not set to the R value, indicating a non-activate 1LQE. Hence, such a queue searching process will atomically check the ID field and set on the forward pointer lock field only if the atomic operation found no R value in the ID field. Such atomic operation would effectively close the problematic time window.

SECOND EMBODIMENT OF THE INVENTION

Figure 5:
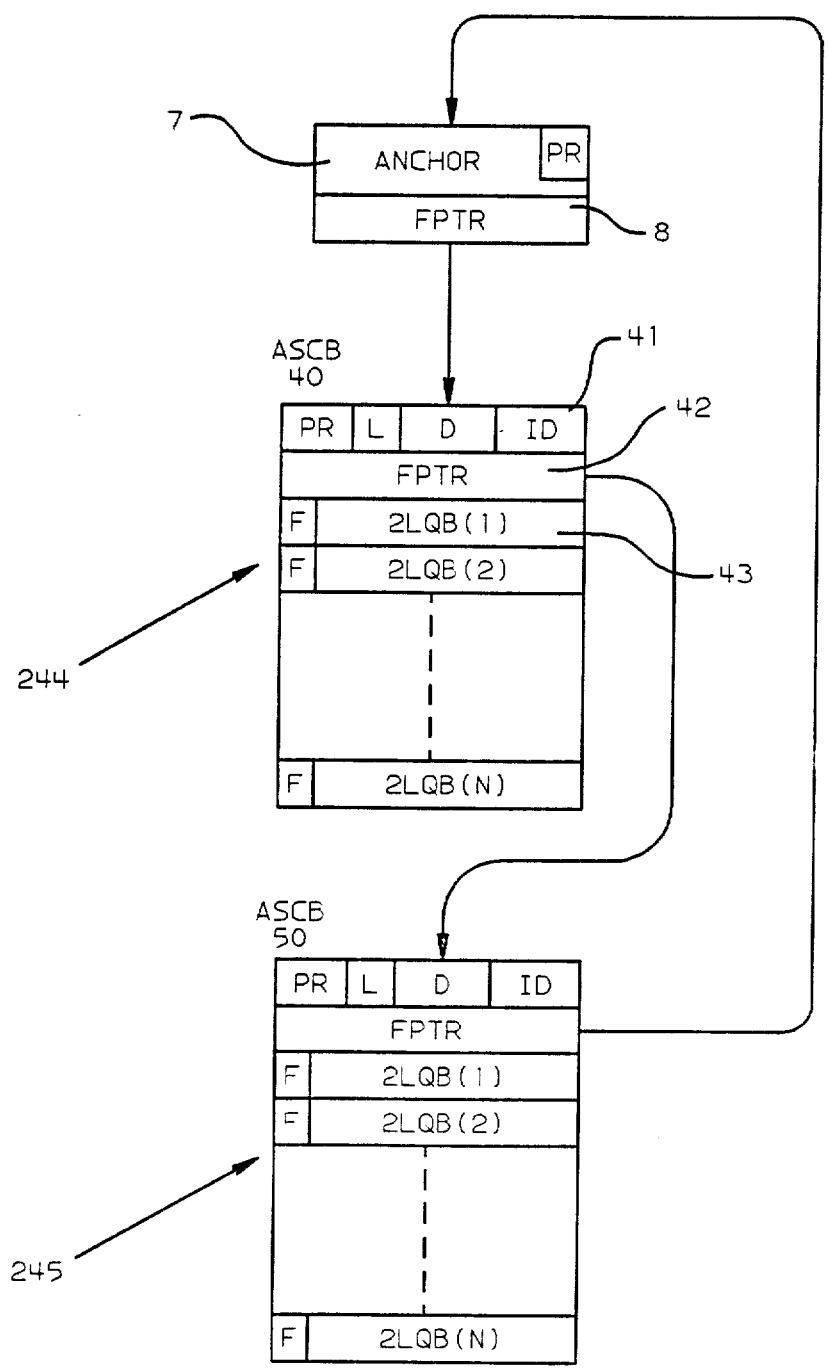
FIG. 5 is used for illustrating a second embodiment of the invention.

FIG. 5 illustrates a second embodiment of the invention in which the second level blocks (2LQBs) are not chained together as in FIG. 2, although the first level elements (1LQEs) are chained together in the same manner as described for the first embodiment. In FIG. 5 each second level queue (2LQ) is in a contiguous area containing the blocks (2LQBs) in a sequence of block entries. The contiguous 2LQBs sequence is shown in FIG. 5 as a part of each first level element (1LQE). Each of the second level blocks has a flag area F, in which an indication signals the type of block (i.e. SRB or TCB) and whether the respective block is in a dispatchable condition or not (i.e. A or W).

Instead of being precisely as shown in FIG. 5, the contiguous 2LQB area may be arranged between the situations shown in FIGS. 2 and 5, wherein the contiguous second level block areas are respectively chained to their first level elements (1LQEs) by respective pointers in their associated 1LQEs, in which the pointers in the 1LQEs may be identical to those shown in FIG. 2, and the second level SRB and TCB blocks are arranged in the manner of the contiguous entries shown in FIG. 5 with each pointer having an associated set of flags.

The methods described in FIGS. 3 and 4 will operate in the same manner in regard to the modified queue shown in FIG. 5.

THIRD EMBODIMENT OF THE INVENTION

Figure 6:
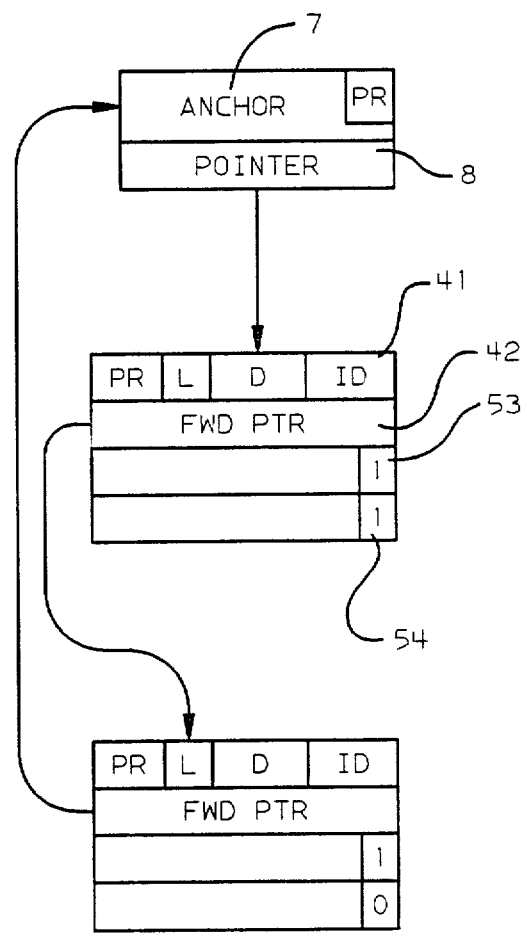
FIG. 6 represents another embodiment of the invention.

A third embodiment of the invention is represented in FIG. 6. It has indicators 53 and 54 of specific requests for service associated with each first level queue element (1LQE). Thus, in FIG. 6, a request for service is indicated for a first level queue element by either of its fields 53 or 54 being set to a 1 state. For example, the queue may represent a sequence of messages that are being sent over a computer network. The binary indicator 53 or 54 in the 1LQE would indicate when the message was successfully sent (53) and if the message should be logged (54) for purposes of an audit trail. The process to send a message would be to initialize a 1LQE to the state that the message was not sent by setting binary indicator 53 to the not sent state. If logging is desired, indicator 54 would be set to the logging required state. If logging was not desired, indicator 54 would be set to the logging not required state. The 1LQE would then be inserted into the queue at its appropriate position relative to other messages waiting to be sent.

FOURTH EMBODIMENT OF THE INVENTION

The fourth embodiment of the invention combines the 1LQE deletion process with the process of finding another 1LQE ready for service. Its queue structure may be like that found in the preferred embodiment, in which a request for service is indicated by any second level block having its indicator set to the active state A (instead of to the wait state W), as exemplified in FIG. 2. The fourth embodiment (unlike the deletion embodiment in FIG. 4) does not test for making inactive the last active block associated with a 1LQE as a condition for deletion of the 1LQE from the queue.

The fourth embodiment has its queue control process start a search at the queue anchor, in order to find the highest-priority 1LQE indicating an active request for service. The search is ended when the first active block is obtained. However, if during the search, any non-active 1LQE is found in the queue, that 1LQE is deleted from the queue as part of the searching process before the next 1LQE is accessed.

In the fourth embodiment, any 1LQE may be left in the queue in a non-active when the search process takes the last active block of that 1LQE. Then, the next search of the queue by any CPU trying to find an active block may encounter that 1LQE and find that it has no active 2LQB, and then the process will thereby delete that 1LQE from the queue.

Hence, each CPU searching the queue for its highest-priority active service request, will delete each inactive first level element encountered during the search. This search will end as soon as a 1LQE is found that indicates a 2LQB active request for service. Any inactive 1LQE located at a position in the queue not encountered by the current search will not be deleted by the current search.

Thus, it is possible that many inactive 1LQEs may remain on the queue after numerous searches in this embodiment. No significant loss of system performance need occur, because each inactive 1LQE in the critical part of the queue (between the queue anchor and the first active 1LQE) will be removed from the queue during the next search for the first active 1LQE; i.e. the search immediately following the search that changed an encountered 1LQE from an active state to an inactive state.

It is of course possible that any 1LQE (made inactive in one search) could be changed to an active state before it is encountered during the next search of the queue, so that this 1LQE would not be deleted when encountered by the next queue search.

While the invention has been described in its preferred embodiments, it is to be understood that the words which have been used are words of description rather than limitation and that changes may be made within the application without departing from the true scope and spirit of the invention in its broader aspects.

Having thus described our invention, what we claim as new and desire to secure by Letters Patent is:

1. A queue coordinating method for a multiprocessing system used by a plurality of requestors, the queue having an anchor element and anywhere from zero to a large plurality of control elements in the memory of the system, the anchor element having a pointer to any first control element of the queue, each element having a pointer to any other element of the queue, the method controlling coordination among the plurality of requestors for element insertion into and deletion from the queue, comprising:

providing a queue status for each element to indicate if the element is in or out of the queue, and to indicate if a current requestor of service represented by the element has an exclusive capability to change the element pointer or if the element pointer is changeable for any requestor accessing the element, providing a queue-order indicator for each element to indicate the position of each element when in the queue relative to each other element in the queue, while the queue status of a deleted element indicates that any requestor may change the element pointer, atomically setting the queue status of the element to indicate that a current requestor is given the exclusive capability to change the element's pointer for an attempt to insert the element into the queue, searching the queue for an insertion location for the deleted element using the queue-order indicator of the deleted element and of each element searched in the queue, and determining the immediately preceding element to the insertion location and any immediately following element after the insertion location, preparing the deleted element for its insertion into the queue at the insertion location found by the searching operation by setting the element pointer to affect address any following element found by the searching operation or to indicate there is no following element in the queue, accessing the preceding element to the insertion location in the queue determined by the searching operation, atomically testing the preceding element to determine if no other requestor is indicated by its queue status to have an exclusive capability to change the pointer of the preceding element, and if the pointer of the preceding element has not changed since the searching operation, on the atomic testing operation finding the stated conditions, continuing the atomic operation to insert the element in the queue at the insertion location by changing the pointer in the preceding element to address the deleted element being inserted, releasing the exclusive capability to change the pointer of the deleted element which has become an inserted element.

2. A queue coordinating method for a multiprocessing system used by a plurality of requestors, the queue having an anchor element and anywhere from zero to a large plurality of control elements in the memory of the system, each control element being capable of representing one or more services potentially available in the system, the anchor element and each control element having a pointer to any next element of the queue, the method controlling coordination among the plurality of requestors for element insertion into and deletion from the queue, comprising:

providing a queue status for each element to indicate if the element is in or out of the queue, and to indicate if the current requestor of queue service has an exclusive capability to change the element pointer or if the element pointer is changeable for any requestor accessing the element, searching the queue in response to a current requestor by beginning the search at the anchor element to search for a control element to process while determining if each searched element is a deletable element, and retaining the address of a preceding element immediately before the searched element in the queue, for a deletable element found by the searching operation while having a queue status indicating a non-exclusive capability for changing the pointer in the element, atomically setting the queue status to indicate an exclusive capability for changing the element's pointer, accessing the preceding element, which is still presumed to immediately precede the deletable element, atomically testing the queue status of the preceding element to determine if no requestor has the exclusive capability to change its pointer, and to determine if this pointer has not changed since it was previously accessed by the searching operation, if the atomic testing operation determines the existence of the stated conditions, continuing the atomic operation to delete the deletable element from the queue by changing the pointer in the preceding element to the pointer in the deletable element, setting the queue status in the deletable element to indicate its change of status to a deleted element no longer in the queue.

3. A queue coordinating method for controlling the insertion of or deleted element into a queue as defined in claim 1, further comprising:

providing for the queue status of each element:

a delete field for indicating if the element is in or out of the queue, a pointer lock field for coordinating among plural requestors, any changes to the pointer in the element, setting off the delete field and thereafter setting off the lock field in an element not in the queue while obtaining the insertion of the deleted element into the queue after the element is made ready for service.

4. A queue coordinating method for controlling the insertion of a deleted element into a queue as defined in claim 3, further comprising:
testing for the states of the pointer lock field and the delete field of an element to determine if an on state exists for both fields to indicate the element is a deleted element not in the queue, and
attempting to insert the deleted element into the queue when the testing operation finds the lock field and the delete field in the element are both in the on state.

5. A queue coordinating method for controlling the insertion of a deleted element into a queue as defined in claim 4, further comprising:
testing for an off state of the pointer lock field in an element, and
inhibiting the attempting operation from inserting the deleted element into the queue when the testing operation detects an off state for the pointer lock field that indicates the deleted element was inserted into the queue for another requestor.

6. A queue coordinating method for controlling the insertion of a deleted element into a queue as defined in claim 3, further comprising:
providing a requestor identifier (ID) field, a pointer lock field (L) and a delete field (D) in each element,
initially saving the address of the deleted element and its pointer in a save area independent of the queue,
setting the ID field to a unique value in the deleted element to indicate that the element is ready for service,
atomically testing the state of the pointer lock field and the delete field to determine if both fields are still in an on state and comparing the pointer in the deleted element with the pointer in the save area for equality to indicate the deleted element was not put in the queue by another requestor,
and if the condition in the atomic testing operation are found, setting the delete field in the deleted element to an off state to indicate to each other requestor that the deleted element is no longer to be considered a deleted element, and
initiating the search operation.

7. A queue coordinating method for controlling the insertion of a deleted element into a queue as defined in claim 6, further comprising:
searching the queue for an insertion location for the deleted element using predetermined search criteria, further including:
comparing the search criteria: (a) of the deleted element and (b) of each element being searched in the queue until an insertion location is found to meet the criteria where the deleted element is to be inserted into the queue,
testing the pointer lock field and then the delete field in the preceding element for an off state indicating the preceding element is still in the queue, but
starting a new search of the queue if both the lock field and the delete field are in an on state,
accessing a next element in the queue if the testing operation finds: (a) the preceding element in the queue has its lock field in an off state, or (b) if the preceding element has its lock field in an on state and the delete field is in an off state.

8. A queue coordinating method for controlling the insertion of a deleted element into a queue as defined in claim 7, the predetermined search criteria further comprising:
providing in each of the elements a priority field containing a priority value indicating a priority assigned to the element,
the search operation using the pointer in each element being searched to find each next element in the queue and,
the comparing operation also comparing the priority values in the priority fields: (a) of the deleted element to be inserted into the queue and (b) of each element in the queue examined by the searching operation until an insertion location is found to meet the search criteria at which the deleted element is to be inserted.

9. A queue coordinating method for controlling the insertion of a deleted element into a queue as defined in claim 8, the search operation further comprising:
saving in a save location independent of the queue: (a) a copy of the address of each element being searched by the search operation and (b) a copy of the pointer field in the element which is the address of its next element in the queue to provide addresses to a preceding element and to a next element between which is the insertion location for the deleted element when the next element meets the search criteria.

10. A queue coordinating method for controlling the insertion of a deleted element into a queue as defined in claim 9, further comprising:
preparing for insertion of the deleted element by setting off its delete field and setting on its pointer lock field and setting the address of the next element into the pointer field of the deleted element being inserted.

11. A queue coordinating method for controlling the insertion of a deleted element into a queue as defined in claim 10, further comprising:
performing the atomic operations of:
testing the state of the pointer lock field of the preceding element to determine if it is in an off state that indicates the preceding element's pointer is not exclusive to another requestor,
comparing the content of the pointer field in the preceding element and the copy of its forward pointer in the save location to determine if any change has occurred to the pointer in the preceding element since it was saved,
inserting the deleted element as an inserted element in the queue at the insertion location by storing the address of the inserted element into the pointer field of the preceding element, and
setting off the pointer lock field in the inserted element upon a successful inserting operation to indicate the inserted element is in the queue.

12. A queue coordinating method for controlling the insertion of a deleted element into a queue as defined in claim 11, further comprising:
signalling that the atomic inserting operation has not successfully operated due to the comparing operation finding an unequal condition indicating the pointer of the preceding element has changed, requiring another insertion location to be found,
again accessing the anchor to do another search of the queue to find another insertion location for the deleted element to be inserted.

13. A queue coordinating method controlling the insertion of a deleted element into a queue as defined in claim 12, further comprising:

signalling that the atomic inserting operation has not successfully operated due to the testing operation finding the lock field is in an on state and field in the preceding element for which the delete field is in an off state in the preceding element to indicate that the prior element has not yet been deleted from the queue but is having interference from another requestor, repeating the testing and comparing operations to wait until the lock field and delete field both become set for another requestor to either their on or off states before continuing operations for the current requestor.

14. A queue coordinating method for controlling the deletion of an element in the queue as defined in claim 2, further comprising:

providing for the queue status of each element:
  a delete field for indicating if the element is in or out of the queue,
  a pointer lock field for coordinating among plural requestors any changes to the pointer in the element,
  setting on the lock field and thereafter setting on the delete field in any element in the queue while obtaining the deletion of the element from the queue after the element is determined to not represent any queue providable service.

15. A queue coordinating method for controlling the deletion of an element in the queue as defined in claim 4, the coordinating method further comprising:

initially accessing the anchor as a current element in a search of the queue and thereafter accessing any next element in the queue as the current element until a ready for service element is found,
  setting an identifier (ID) field in the current element to identify a processor currently requesting service of the queue,
  saving a pointer in the current element in an independent location as a saved address of any next element in the queue,
  determining if the current element represents any available queue service,
  exiting the search whenever the determining operation determines no available service is represented by the current element, otherwise continuing the determining operation to determine if the current element may be deleted from the queue.

16. A queue coordinating method for controlling the deletion of an element in the queue as defined in claim 15, the coordinating method further comprising:

atomically testing for the state of the pointer lock field in the current element to determine if it is still set to an off state indicating that the current element is not in the process of being deleted for another requestor, and atomically setting on the pointer lock field in the current element when the testing operation finds the lock field is in an off state to successfully perform the atomic setting operation,
  but providing an unsuccessful indication for the atomic testing operation if the lock field is found in an on state.

17. A queue coordinating method for controlling the deletion of an element in the queue as defined in claim 16, the coordinating method further comprising:

testing the state of the delete field in the current element after the unsuccessfully operation is provided in order to determine if the current element has been deleted from the queue for another requestor.

18. A queue coordinating method for controlling the deletion of an element in the queue as defined in claim 17, the coordinating method further comprising:

initiating a search for any next element in the queue when the delete field testing operation finds the delete field is off and when the determining operation indicates no available service is represented by the current element in order to leave any deletion of the current element for another requestor.

19. A queue coordinating method for controlling the deletion of an element in the queue as defined in claim 18, the coordinating method further comprising:

exiting the search to perform an available service represented by the element when the atomic setting of the lock field is unsuccessful and when the determining operation indicates available service is represented by the current element.

20. A queue coordinating method for controlling the deletion of an element in the queue as defined in claim 19, the element coordinating method further comprising:

starting the search over again for finding available service represented by the queue when the delete field testing operation finds the delete field is on and when the indicating operation indicates no available service is represented by the current element.

21. A queue coordinating method for controlling the deletion of an element in the queue as defined in claim 16, the coordinating method further comprising:

comparing the ID field in the current element and the identifier of a current requestor when the atomic setting operation is performed successfully to determine if any change has occurred to the ID field in the current element since it was set by the current requestor,
  continuing a deletion attempt for the current element if the comparing operation finds equality between the ID field and the current requestor's identifier,
  but discontinuing the deletion attempt for the current element by setting off the pointer lock field of the current element if the ID comparing operation finds the ID comparison unequal.

22. A queue coordinating method for controlling the deletion of an element in the queue as defined in claim 21, the coordinating method for element deletion further comprising the following operations performed atomically:

testing for the state of the pointer lock field in the preceding element to determine if it is in an off state indicating that the preceding element's pointer can be changed for deleting the current requestor,
  comparing the pointer in the preceding element with the saved address of the current element to determine if the pointer in the preceding element has changed,
  deleting the current element from the queue by copying the saved pointer of the current element into the pointer field of the preceding element, and setting off the pointer lock field and the delete field in the preceding element,
  atomically executing the deleting operation concurrently with the testing operation and the comparing operation when the testing operation detects an off state for the pointer lock field in the preceding element and the comparing operation detects equality indicating that the pointer in the preceding element has not changed, providing a successful execution for the atomically performed operations when the deleting operation makes the deletion of the current element, and providing an unsuccessful execution for the atomically executing means when the deleting operation does not make the deletion of the current element due to either the lock field being on in the preceding element or a change being found in the pointer of the preceding element.

23. A queue coordinating method for controlling the deletion of an element in the queue as defined in claim 22, the coordinating method further comprising:

setting on the delete field in the current element after a successful execution it provided for the atomically executing operation to indicate to all requestors that the current element has been deleted from the queue.

24. A queue coordinating method for controlling the deletion of an element in the queue as defined in claim 23, the coordinating method further comprising:

continuing the search by accessing any next element in the queue following the deleted current element after a successful execution of the atomically executing means when the determining operation indicates no available service is represented by the current element.

25. A queue coordinating method for controlling the deletion of an element in the queue as defined in claim 24, the coordinating method further comprising:

exiting the search to use available service determined by the determining operation.

26. A queue coordinating method for controlling the deletion of an element in the queue as defined in claim 25, the coordinating method further comprising:

setting off the pointer field lock field in the current element in response to the ID field comparing operation finding an unequal comparison and discontinuing the deletion attempt for the current element.

27. A queue coordinating method for controlling the deletion of an element in the queue as defined in claim 25, the coordinating method further comprising:

setting off the pointer lock field in the current element in response to the unsuccessful execution operation due to the lock field being found on in the preceding element to indicate its pointer is not available for change by the current requestor and discontinuing the deletion attempt for the current element.

28. A queue coordinating method for controlling the deletion of an element in the queue as defined in claim 25, the coordinating method further comprising:

setting off the pointer lock field in the current element to indicate the pointer is available for change by another requestor in response to the unsuccessful operation due to the forward pointer in the preceding element being found to have been changed and discontinuing the deletion attempt for the current element.

29. A queue coordinating method for controlling the deletion of an element in the queue as defined in claim 28, the coordinating method further comprising:

exiting the search to perform available service found by the determining operation.

30. A queue coordinating method for controlling the deletion of an element in the queue as defined in claim 29, the coordinating method further comprising:

examining the ID field of the current element for a special value that indicates available service has recently been represented for the current element, again searching the current element for the available service newly indicated to exist for the current element if no service was found by the determining operation.

31. A queue coordinating method for controlling the deletion of an element in the queue as defined in claim 30, the coordinating method further comprising:

but continuing the search to the next element in the queue if no available service is indicated for the current element by the ID field when it does not contain the identifier of the current requestor.

32. A queue coordinating method for controlling the deletion of an element in the queue as defined in claim 31, the coordinating method further comprising:

accessing any next element in the queue with the pointer in the current element when no service is determined for the current element, and saving the next pointer address in an independent save location, redefining contents of the independent save locations when any next element is accessed: in which the saved pointer to the current element becomes the saved pointer to the preceding element, the saved pointer of the next element becomes the saved pointer of the current element.

33. A queue coordinating method as defined in claims 1 or 2, the coordinating method further comprising:

providing each element with a potential subsequent set of blocks associated with the current element in which each block can represent a unit of service for the queue, indicating with each element when one or more associated blocks represent currently available service, searching the queue from the anchor element to find a block representing currently available service for a requesting processor, and the first block for an element used to provide its represented service for the requesting processor, determining when a block representing current service is to be the last block of an element to represent current service for that element for determining that a deletion attempt is to be made for the current element, and setting on the lock field in the element to indicate to other requestors that the requestor setting the identifier field has the exclusive capability to change the pointer field.

34. A queue coordinating method as defined in claims 1 or 2, the coordinating method further comprising:

using the queue for dispatching work on the processors in the multiprocessing system, in which dispatching is the service provided by the queue, providing each element with at least one dispatching subqueue of dispatching service requests.

35. A queue coordinating method as defined in claims 1 or 2, the coordinating method further comprising:

providing such element with an indicator of service required.

36. A queue coordinating method as defined in claim 34, the providing operation further comprising:

providing each element with at least one dispatching subqueue of task control blocks or service request blocks.

* * * * *